US012731389B2

(12) United States Patent
Fathollahi Ghezelghieh et al.

(10) Patent No.: US 12,731,389 B2
(45) Date of Patent: Sep. 8, 2026

(54) VIDEO-BASED SURGICAL SKILL ASSESSMENT USING TOOL TRACKING

(71) Applicant: Verb Surgical Inc., Santa Clara, CA (US)

(72) Inventors: Mona Fathollahi Ghezelghieh, Sunnyvale, CA (US); Mohammad Hasan Sarhan, Santa Clara, CA (US); Jocelyn Barker, San Jose, CA (US); Lela Dimonte, Mountain View, CA (US)

(73) Assignee: Auris Health, Inc., Santa Clara, CA (US)

( * ) Notice: Subject to any disclaimer, the term of this patent is extended or adjusted under 35 U.S.C. 154(b) by 447 days.

(21) Appl. No.: 18/186,798

(22) Filed: Mar. 20, 2023

(65) Prior Publication Data

US 2023/0298336 A1 Sep. 21, 2023

Related U.S. Application Data

(60) Provisional application No. 63/322,166, filed on Mar. 21, 2022.

(51) Int. Cl.
*G06V 10/00* (2022.01)
*G06V 10/764* (2022.01)
*G06V 10/82* (2022.01)

(52) U.S. Cl.
CPC ............ *G06V 10/82* (2022.01); *G06V 10/764* (2022.01); *G06T 2207/20081* (2013.01)

(58) Field of Classification Search
CPC ...... G06V 10/82; G06V 10/764; G06V 20/52; G06T 2207/20081
See application file for complete search history.

(56) References Cited

U.S. PATENT DOCUMENTS

2012/0253360 A1 10/2012 White et al.
2020/0367974 A1* 11/2020 Khalid .................. G06N 3/045
(Continued)

FOREIGN PATENT DOCUMENTS

WO 2012060901 A1 5/2012
WO 2017083768 A1 5/2017

OTHER PUBLICATIONS

Lee et al, Evaluation of Surgical Skills during Robotic Surgery by Deep Learning-Based Multiple Surgical Instrument Tracking in Training and Actual Operations, J. Clin. Med. 2020, 9(6), 1964 (Year: 2020).*
(Continued)

*Primary Examiner* — Xiao Liu
(74) *Attorney, Agent, or Firm* — Aikin & Gallant, LLP

(57) ABSTRACT

A process for classifying a surgeon's technical skill in performing a surgery receives a tool-motion track comprising a sequence of detected tool motions of a surgeon performing a surgery with a surgical tool. A sequence of multi-channel feature matrices to mathematically represent the tool-motion track is then generated. Next, a one-dimensional (1D) convolution operation is performed on the sequence of multi-channel feature matrices to generate a sequence of context-aware multi-channel feature representations of the tool-motion track. The sequence of context-aware multi-channel feature representations is subsequently processed by a transformer model to generate a skill classification, wherein the transformer model is trained to focus on a subset of tool motions in the sequence of detected tool motions that are most relevant to the skill classification. Other aspects are also described and claimed.

13 Claims, 11 Drawing Sheets

LEARNING-BASED SKILL-ASSESSMENT MODEL 800

(56) References Cited

U.S. PATENT DOCUMENTS

2021/0313051 A1 10/2021 Asselmann et al.
2023/0177703 A1 6/2023 Ghezelghieh et al.

OTHER PUBLICATIONS

Bergmann et al, Tracking without bells and whistles, Proceedings of the IEEE/CVF International Conference on Computer Vision (ICCV), pp. 941-951. (Year: 2019).*
Oropesa et al, Laparoscopic instrument tracking based on endoscopic video analysis for psychomotor skills assessment. Surg. Endosc, 27:1029-1039 (Year: 2013).*
Pérez-Escamirosa et al, Objective classifcation of psychomotor laparoscopic skills of surgeons based on three dfferent approaches, International Journal of Computer Assisted Radiology and Surgery 15:27-40 (Year: 2020).*
Bergmann, P., "Tracking without bells and whistles", Proceedings of the IEEE/CVF International Conference on Computer Vision (ICCV), 2019, pp. 941-951.
Harmans, A., et al., "In Defense of the Triplet Loss for Person Re-Identification", arXiv:1703.07737v4 [cs.CV], Nov. 21, 2017, 17 pages.
Supplementary European Search Report received for EP Patent Application No. 23774110.3, mailed Jul. 25, 2025, 9 pages.
International Search Report and The Written Opinion of The Searching Authority received for PCT Patent Application No. PCT/IB2023/052782, mailed on Sep. 28, 2023, 8 pages.
International Preliminary Report of Patentability received for PCT Patent Application No. PCT/IB2023/052782, mailed on Oct. 3, 2024, 6 pages.
David P. Azari, et al.; "Modeling surgical technical skill using expert assessment for automated computer rating," retrieved online: Ann Surg. Mar. 2019 ; 269(3): 574-581. doi:10.1097/SLA.0000000000002478; HHS Public Access Aug. 7, 2020; 19 pages.
Ariel Kate Dubin, et al.; "A model for predicting the GEARS score from virtual reality surgical simulator metrics;" retrieved online: https://doi.org/10.1007/s00464-018-6082-7; Surgical Endoscopy (2018) 32:3576-3581; Feb. 5, 2018; 6 pages.
Sean Estrada, et al.; "On the Development of Objective Metrics for Surgical Skills Evaluation Based on Tool Motion;" retrieved online: https://ieeexplore.ieee.org/abstract/document/6974411/DOI: 10.1109/SMC.2014.6974411; Dec. 4, 2014; 6 pages.
Mahtab J. Fard, et al.; "Automated robot-assisted surgical skill evaluation: Predictive analytics approach;" retrieved online: https://doi.org/10.1002/rcs.1850; wileyonlinelibrary.com/journal/rcs; Int J Med Robotics Comput Assist Surg. 2018;14:e1850; Jun. 2, 2017; 10 pages.
Mahtab J. Fard, et al."Soft Boundary Approach for Unsupervised Gesture Segmentation in Robotic-Assisted Surgery;" retrieved online: IEEE Xplore.com; IEEE Robotics and Automation Letters, vol. 2, No. 1, Jan. 2016; 8 pages.
Andrew J. Hung, et al.; "Automated Performance Metrics and Machine Learning Algorithms toMeasure Surgeon Performance and Anticipate Clinical Outcomes in Robotic Surgery;" retrieved online: jamasurgery.com; JAMA Surgery Aug. 2018 vol. 153, No. 8 (Reprinted); 2 pages.
H.W. Kuhn; "The Hungarian Method for the Assignment Problem;" retrieved online:https://onlinelibrary.wiley.com/doi/abs/10.1002/nav.3800020109; https://doi.org/10.1002/nav.3800020109; Mar. 1955;15 pages.
Hei Law, et al. ; "Surgeon Technical Skill Assessment using Computer Vision based Analysis;" retrieved online: https://proceedings.mlr.press/v68/law17a/law17a; Proceedings of Machine Learning for Healthcare 2017; JMLR W&C Track vol. 68; 12 pages.
Marc Levin et al.; "Automated Methods of Technical Skill Assessment in Surgery: A Systematic Review;" retrieved online: doi:10.1016/j.jsurg.2019.06.011.Journal; Journal of Surgical Education; vol. 76; No. 6; Nov./Dec. 2019 (1629-1639); 11 pages.
Anton Milan, et al.; "MOT16: A Benchmark for Multi-Object Tracking;" retrieved online: arXiv:1603.00831v2 [cs. CV] May 3, 2016; 12 pages.
Chinedu Innocent Nwoyea, et al.; "Rendezvous: Attention Mechanisms for the Recognition of Surgical Action Triplets in Endoscopic Videos;" retrieved online: arXiv:2109.03223v2 [cs.CV] 3; https://endovissub-workflowandskill.grand-challenge.org; Mar. 2022; 23 pages.
Irene Rivas-Blanco, et al.; "A surgical dataset from the da Vinci Research Kit for task automation and recognition;" retrieved online: arXiv:2102.03643v2 [cs.RO] Jun. 29, 2023; Proceedings of the International Conference on Electrical, Computer, Communications and Mechatronics Engineering (ICECCME 2023), Tenerife, Canary Islands, Spain, Jul. 19-20, 2023; 6 pages.
Somayeh B Shafiei et al.; "Using Two-Third Power Law for Segmentation of Hand Movement in Robotic Assisted Surgery;" retrieved online:http://asmedigitalcollection.asme.org/IDETC-CIE/proceedings-pdf/IDETC-CIE2015/57144/V05CT08A014/4258523/v05ct08a014-detc2015-47813; Proceedings of the ASME 2015 International Design Engineering Technical Conferences & Computers and Information in Engineering Conference, IDETC/CIE Aug. 2-5, 2015, 2015, Boston, Massachusetts, USA; 6 pages.
Andru P. Twinanda, et al.; "EndoNet: A Deep Architecture for Recognition Tasks on Laparoscopic Videos;" retrieved online arXiv:1602.03012v2 [cs.CV] May 23, 2016; 11 pages.
Melina C. Vassiliou, M.D., et al.; "A Global Assessment Tool For Evaluation of Intraoperative Laparoscopic Skills;" retrieved online: doi:10.1016/j.amjsurg.2005.04.004; The American Journal of Surgery (Excerpta Medica Inc.) 190 (2005) 107-113; Dec. 31, 2004, 7 pages.
Ashish Vaswani, et al.; "Attention Is All You Need;" retrieved online: arXiv:1706.03762v7 [cs.CL] Aug. 2, 2023; 31st Conference on Neural Information Processing Systems (NIPS 2017), Long Beach, CA, USA; 15 pages.
Qingsong Wen, et al.; "Transformers in Time Series: A Survey;" retrieved online: arXiv:2202.07125v5 [cs. LG] May 11, 2023; 9 pages.
Benjaminde Witte, et al.; "Cost-Efficient Laparoscopic HapticTrainer based on Affine VelocityAnalysis;" retrieved online: HAL Id:hal-01563262, https://hal.science/hal-01563262v1; Feb. 4, 2019; 2 pages.
Yi Wu, et al.; "Online Object Tracking: A Benchmark;" retrieved online: https://ieeexplore.ieee.org/document/6619156; DOI: 10.1109/CVPR.2013.312; Oct. 3, 2013; 8 pages.
Yifu Zhang et al.; "ByteTrack: Multi-Object Tracking by Associating Every Detection Box;" retrieved online: https://doi.org/10.48550/arXiv.2110.06864v3; Apr. 7, 2022; 19 pages.
Aneeq Zia, et al.; "Automated Surgical Skill Assessment in RMIS Training;" retrieved online: https://doi.org/10.48550/arXiv.1712.08604v1, Dec. 22, 2017; 12 pages.

* cited by examiner

Algorithm 600

```
foreach framei do
    run track location prediction(active_tracks);
    detected_tools ← detect tools in frame(i);
    foreach d ∈ detected_tools do
        appearance_features[d] ← extract appearance features(d);
    foreach t ∈ active_tracks do
        foreach d ∈ detected_tools do
            cost_matrix[t, d] ← cost((t, d));
    assignments ← run hungrian assignment(cost_matrix);
    foreach d ∈ unassigned_detections do
        if d is matchable to an inactive track then
            recover inacive track;
        else
            initialize a new track using d;
    update/inactive tracks(assignments);
```

FIG. 6

| Metric | Definition | Stat |
|---|---|---|
| Distance | Tool path length | Cumulative sum |
| Velocity | Tool speed | Median |
| Acceleration | Tool acceleration | Median |
| Jerk | Tool jerk | Median |
| Curvature | Straightness of the path, calculated at each point | Median |
| Tortuosity | calculating length of movement path between intersections with the straight line | Median |
| Turning Angle | Direction of movement with regards to previous and next time steps | Median |
| Motion Ratio | Ratio of Time in Motion to Total Time | |

Fig. 11

VIDEO-BASED SURGICAL SKILL ASSESSMENT USING TOOL TRACKING

PRIORITY CLAIM AND RELATED PATENT APPLICATIONS

This patent application claims the benefit of U.S. Provisional Patent Application No. 63/322,166, entitled "Video-based Surgical Skill Assessment Using Tool Tracking," filed on 21 Mar. 2022. The preceding patent application and provisional patent applications are hereby incorporated by reference as a part of this application.

TECHNICAL FIELD

The disclosed embodiments generally relate to surgical tool motion tracking and surgical skill analysis. More specifically, the disclosed embodiments relate to video-based multi-tool tracking and tool-motion analysis using deep learning, as well as video-based surgeon skill assessment and classification using tool-motion tracks generated from surgical videos.

BACKGROUND

Tracking a surgeon's instrument (e.g., surgical tools) movements during minimally invasive surgery (MIS) or minimally invasive procedure (MIP) is a critical step towards automating the measurement of a surgeon's technical skills. Tool-motion metrics calculated from the tool movement path/trajectory have been shown to correlate with surgeon experience, learning curve progression, and patient outcome measures. Typically, it is only feasible to calculate tool-motion metrics for training simulators or robot-assisted MIS procedures directly using the robot kinematic output. However, with most MIP cases worldwide being performed laparoscopically rather than robotically, a broadly applicable solution is needed for instrument tracking. Using computer vision techniques to generate the tool positional data would enable calculation of the tool-motion metrics based exclusively on surgical case videos, thereby not relying on data outputs of a specific surgical device.

A surgeon's technical skills are typically evaluated during a video review by experts, using rating scales that assign numerical values to specific characteristics exhibited by the surgeon's movements. For example, the Global Operative Assessment of Laparoscopic Skills (GOALS) scale uses a five-point Likert scale to evaluate a surgeon's depth perception, bimanual dexterity, efficiency, and tissue handling. The GOALS scores are sometimes also used as a baseline for comparing other techniques for surgeon's technical skill ratings. Instead of relying on manual review, a number of studies have explored techniques to automate the technical-skill evaluations based on a surgeon's movement pattern. For the surgeon's movement pattern, metrics of interest such as path length, velocity, acceleration, turning angle, curvature, and tortuosity of the tools can be calculated and used to determine a surgeon's skill level. Additionally, motion smoothness metrics, such as jerk have been shown to indicate the lack of mastery of a task, which can be used to measure a surgeon's progression along the learning curve. Moreover, feature extraction techniques applied on instrument trajectories have been used to classify surgeons by skill levels.

Existing work has shown the ability to use feature-based approaches to distinguish surgeons of different technical-skill levels. However these existing approaches have generally been performed in lab tasks or using kinematic robotic data coming out of the accelerometer inside the robot. However, these existing feature-based approaches have found very limited success in more complex and more realistic surgical scenarios.

SUMMARY

Disclosed are various video-based tool-motion tracking as well as surgeon technical-skill assessment systems and techniques based on computer vision and deep learning. More specifically, the disclosed tool-motion tracking systems and techniques employ various computer vision and deep-learning models configured to both detect new tools entering video frames and continuously generate tool positional data that can be used to calculate motion trajectories and other motion metrics based exclusively on laparoscope video feeds. The disclosed video-based tool-motion tracking framework utilizes various tracking techniques that are suitable for long sequences tracking with a minimal amount of identity switches. This is achieved by tailoring a cost criterion that takes into consideration semantic, spatial, and class similarity into consideration when assigning detections to established tracks. Because the disclosed tool-motion tracking systems and techniques can simultaneously track multiple surgical, the disclosed tool motion tracking systems and techniques are also referred as "multiple surgical tool tracking" (MSTT) systems and techniques.

Specifically, the disclosed MSTT systems and techniques employ at least two deep-learning models: a first model configured for detecting one or more surgical tools within each video frame, and a second model configured to simultaneously track multiple surgical tools by estimating the trajectories of several tools simultaneously present within a video segment and assigning the newly detected objects to the right trajectories. Note that the two deep-learning models operate in tandem in a tracking-by-detection framework, which is designed to link detected objects across a sequence of frames correctly based on the localized bounding boxes of the detected objects. Moreover, the second model is also configured to re-identify tools after they have temporally left the video frames and the corresponding tracks become inactive. Using the disclosed tool tracking model, the MSTT systems and techniques can estimate the track/trajectory for each of the tracked tools by establishing the (x, y) coordinates continuously for the tracked tool, e.g., for both the left-hand and right-hand tools that a surgeon uses throughout a given surgical step or task. In some embodiments, after generating the trajectories by the disclosed MSTT systems and techniques, the surgeon performance metrics such as path length and derivatives of displacement can be calculated based on these trajectories.

The MSTT systems and techniques are able to estimate the track/trajectory (i.e., the x and y image locations) of right and left tools that the surgeon uses in each surgical task. The proposed multi-tool tracking framework employs a tracking-by-detection scheme wherein at each new frame, active-used tools are detected and assigned to the existing tracks. The MSTT systems and techniques require two deep-learning models that are trained in advanced: the first one is a "tool detection" model, based on Faster-RCNN model, trained to localize surgical tools at each frame of the video; and the second model is a re-identification (or "re-ID") model that is trained to distinguish between multiple simultaneously detected tools. The re-ID model is trained to learn feature descriptions of each generated bounding box of a detected tool such that if two bounding boxes belong to the same track, then their feature corresponding descriptors should be close in Euclidean space compared to two feature descriptors of bounding boxes corresponding to two different tracks.

Also disclosed are various video-based surgeon technical-skill (or simply "surgeon skill") assessment and classification techniques using tool-motion tracks generated from surgical videos, e.g., using the disclosed MSTT system. From the vide-generated tool-motion tracks, reliable motion features can be extracted and used for assessing surgeon's technical skill in terms of both surgical efficiency and surgical proficiency. In this disclosure, both a feature-based deep-learning skill-assessment technique and a transformer-based deep-learning skill-assessment technique are provided. More specifically, the disclosed feature-based deep-learning skill-assessment technique utilizes the statistical values (e.g., the average values) of motion features extracted from generated tool-motion tracks/trajectories to generate the surgeon skill classifications. In contrast, the disclosed transformer-based deep-learning skill-assessment technique utilizes temporal-based multi-channel motion features extracted from generated tool-motion tracks/trajectories to generate the surgeon skill classifications. The performances of the two deep-learning skill-assessment techniques are compared In one aspect, a process for tracking surgical tools in a surgical video is disclosed. The process begins by receiving one or more established tracks for one or more previously-detected surgical tools in the surgical video. The process then processes a current frame of the surgical video to detect one or more objects using a first deep-learning model. Next, for each detected object in the one or more detected objects, the process further performs the flowing steps to assign the detected object to a right track: (1) computing a semantic similarity between the detected object and each of the one or more established tracks; (2) computing a spatial similarity between the detected object and the latest predicted location for each of the one or more established tracks; and (3) attempting to assign the detected object to one of the one or more established tracks based on the computed semantic similarity and the spatial similarity metric.

In some embodiments, prior to processing the current frame, the process converts a frame rate of the surgical video so that the converted frame rate is greater or equal to a predetermined frame rate, and resizes the current frame into a predetermined image size.

In some embodiments, the first deep-learning model is a Faster-RCNN model trained to detect and classify a set of diverse types of surgical tools within a given video frame of the surgical video.

In some embodiments, the one or more previously-detected surgical tools include a left-hand tool and a right-hand tool.

In some embodiments, the process computes the spatial similarity between the detected object and the latest predicted location for each of the one or more established tracks by: (1) using a second deep-learning model to extract a set of image features from the detected object; and (2) comparing the set of extracted image features with multiple sets of stored image features associated with the established track to determine whether the detected object and the previously-detected images of the surgical tool associated with the established track are visually similar.

In some embodiments, the set of image features forms a feature vector of 128 dimensions.

In some embodiments, the multiple sets of stored image features are associated with a number of previously-detected images of the surgical tool over a predetermined time period.

In some embodiments, prior to computing the spatial similarity, the process receives a location on the generated bounding box for the detected object. The process then generates the latest predicted location for the established track by applying a Kalman filter to the received location of the detected object and the last known location of the established track.

In some embodiments, location of the bounding box is the center of the bounding box.

In some embodiments, the process attempts to assign the detected object to one of the established tracks by using a data association technique on the computed semantic similarity and the computed spatial similarity metrics between the detected object and each of the one or more established tracks.

In some embodiments, the data association technique employs a Hungarian method that is configured to identify a correct track assignment within the one or more established tracks for the detected object by minimizing a cost function of the track assignment between the detected object and the one or more established tracks.

In some embodiments, the Hungarian method employs a bipartite graph to solve the cost function associated with the detected object.

In some embodiments, the process assigns a very high weight to a track assignment if the corresponding computed spatial similarity is greater than a predetermined distance threshold to prohibit the said track assignment.

In some embodiments, the cost function additionally includes a track ID associated with the established track and a class ID assigned to the detected object.

In some embodiments, the process assigns a very high weight to a track assignment if the corresponding track ID associated with the established track does not match the class ID of the detected object to prohibit the said track assignment.

In some embodiments, the process further includes the steps for recovering an inactive track by: (1) receiving a detected object in the one or more detected objects that cannot be assigned to any track in the one or more established tracks; and (2) determining if the location of the unassigned object is sufficiently close to the last known location of an inactive track in the one or more established tracks and if a class ID of the unassigned object matches a track ID of the inactive track; and (3) if so, re-assigning the unassigned object to the inactive track to reactivate the previously established track that has become inactive.

In another aspect, a process for classifying a surgeon's technical skill in performing a surgery is disclosed. During operation, the process receives a tool-motion track comprising a sequence of detected tool motions of a surgeon performing a surgery with a surgical tool. The process then generates a sequence of multi-channel feature matrices to mathematically represent the tool-motion track. Next, the process processes the sequence of multi-channel feature matrices using a deep-learning model to generate a skill classification for the surgeon performing the surgery, wherein the deep-learning model has been trained to identify and focus on a subset of tool motions in the sequence of detected tool motions that are most relevant to the skill classification.

In some embodiments, the deep-learning model is a transformer model, and the process processes the sequence of multi-channel feature matrices by: (1) performing a one-dimensional (1D) convolution operation on the sequence of multi-channel feature matrices by convolving each multi-channel feature matrix within the sequence of multi-channel feature matrices with a kernel of a predetermined time length to generate a context-aware multi-channel feature representation of the multi-channel feature matrix; and (2) processing the sequence of context-aware multi-channel feature representations of the motion track, by the transformer model, to generate the skill classification.

In some embodiments, the transformer model identifies and focuses on the subset of tool motions that are most relevant to the skill classification by using a self-attention technique.

In some embodiments, the process convolves each multi-channel feature matrix with the kernel by separately convolving each channel of the multi-channel feature matrix with the kernel.

In some embodiments, the 1D convolution operation compares the multi-channel feature matrix at the given time-step with a number of adjacent time-steps both before and after the given time-step. As a result, the context-aware multi-channel feature representation embeds an amount of learned relationships to the number of adjacent time-steps both before and after the given time-step.

In some embodiments, the motion track is generated based on a sequence of locations of the tool detected within a sequence of video frames captured at a set of time-steps. Moreover, each multi-channel feature matrix within the sequence of multi-channel feature matrices is generated at a corresponding time-step in the set of time-steps.

In some embodiments, the multi-channel feature matrix is composed of at least the following signal channels: (1) a time-step; (2) a (X, Y) coordinates of the detected tool location within the corresponding video frame detected at the a time-step; and (3) a size of a bounding box of the detected tool within the corresponding video frame detected at the time-step.

In some embodiments, the multi-channel feature matrix additionally includes a temporal mask channel indicating the tool present/absence in the corresponding video frame.

In yet another aspect, a surgeon-skill classification system is disclosed. This surgeon-skill classification system includes one or more processors and a memory coupled to the one or more processors. Moreover, the memory stores instructions that, when executed by the one or more processors, cause the system to: (1) receive a motion track comprising a sequence of detected tool motions of a surgeon performing a surgery with a surgical tool; (2) generate a sequence of multi-channel feature matrices to mathematically represent the motion track; and (3) process the sequence of multi-channel feature matrices using a deep-learning model to generate a skill classification for the surgeon performing the surgery wherein the deep-learning model has been trained to identify and focus on a subset of tool motions in the sequence of detected tool motions that are most relevant to the skill classification.

In some embodiments, the deep-learning model is a transformer model, and the memory further stores instructions that, when executed by the one or more processors, cause the system to: (1) perform a one-dimensional (1D) convolution operation on the sequence of multi-channel feature matrices by convolving each multi-channel feature matrix within the sequence of multi-channel feature matrices with a kernel of a predetermined time length to generate a context-aware multi-channel feature representation of the multi-channel feature matrix; and (2) process the sequence of context-aware multi-channel feature representations of the motion track, using the transformer model, to generate the skill classification.

In still another aspect, a process for classifying a surgeon's technical skill in performing one or more surgical tasks is disclosed. During operation, the process receives a motion track comprising a sequence of detected tool motions generated based on a sequence of video frames capturing a surgeon performing a surgical task with a surgical tool. Next, the process decomposes the motion track into a sequence of 2D coordinates in the 2D-pixel space of the video frames. The process then computes a set of tool-motion metrics that characterizes the detected tool motions based on the sequence of 2D coordinates and the variations of the sequence of 2D coordinates overtime. The process subsequently processes the set of computed tool-motion metrics using a deep-learning model to generate a skill classification for the surgeon performing the surgical task, wherein the deep-learning model has been trained.

In some embodiments, the deep-learning model is a random forest model, and using the random forest model to process the set of tool-motion metrics includes: (1) applying a plurality of trained decision tree models on the set of computed tool-motion metrics to generate a plurality of class predictions of either a high technical-skill class or a low technical-skill class for the surgeon; and (2) generating an overall technical-skill classification for the surgeon based on the majority vote of either the high technical-skill class or the low technical-skill class among the plurality of predictions.

In some embodiments, each decision tree model in the plurality of trained decision tree models generates a corresponding class prediction based on a randomly-selected subset of the set of computed tool-motion metrics.

In some embodiments, the set of computed tool-motion metrics includes the following metrics: (1) a distance; (2) a velocity; (3) an acceleration; (4) a jerk; (5) a curvature; (6) a tortuosity; (7) a turning angle; and (8) a motion ratio.

In some embodiments, the process computes a tool-motion metric in the set of tool-motion metrics by: (1) computing a value for the tool-motion metric at each time-step corresponding to each video frame in the sequence of video frames; and (2) computing the tool-motion metric by averaging the set of computed values for the tool-motion metric.

BRIEF DESCRIPTION OF THE DRAWINGS

The structure and operation of the present disclosure will be understood from a review of the following detailed description and the accompanying drawings in which like reference numerals refer to like parts and in which:

FIG. 6 shows an algorithm that summarizes the disclosed multi-tool/object tracking and the disclosed track-recovery/re-ID techniques based on the concept of tracking-by-detection in accordance with some embodiments described herein.

FIG. 11 summarizes a set of motion metrics and their simple definitions.

DETAILED DESCRIPTION

Figure 1:
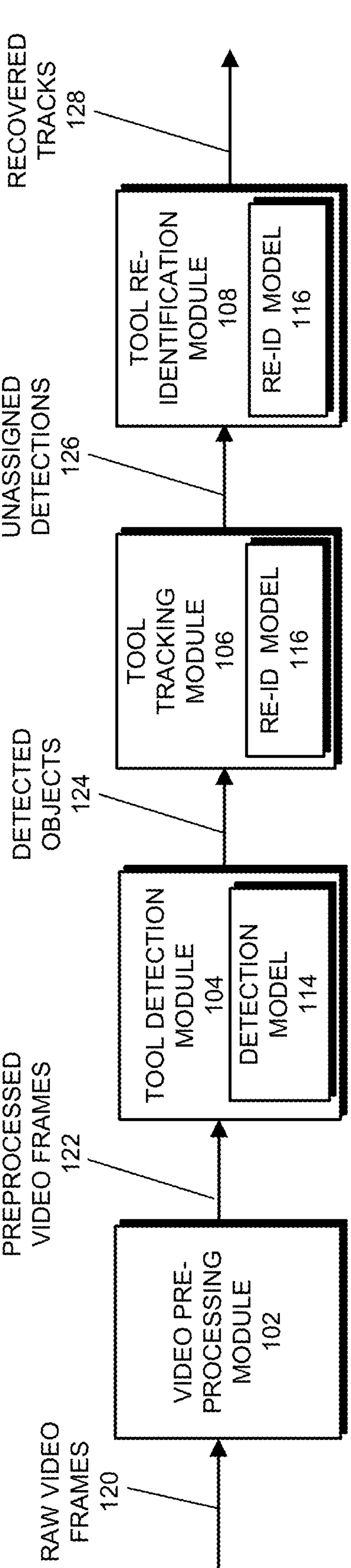
FIG. 1 shows a block diagram illustrating an exemplary multiple surgical tool tracking (MSTT) system for implementing the disclosed user-presence/absence recognition techniques in accordance with some embodiments described herein.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Disclosed are various video-based tool motion tracking systems and techniques based on computer vision and deep learning. More specifically, the disclosed tool motion tracking systems and techniques employ various computer vision and deep learning models configured to both detect new tools entering video frames and continuously generate tool positional data that can be used to calculate motion trajectories and other motion metrics based exclusively on laparoscope video feeds. Because the disclosed tool motion tracking systems and techniques can simultaneously track multiple surgical, the disclosed tool motion tracking systems and techniques are also referred as “multiple surgical tool tracking” (MSTT) systems and techniques.

Specifically, the disclosed MSTT systems and techniques employ at least two deep-learning models: a first model configured for detecting one or more surgical tools within each video frame, and a second model configured to simultaneously track multiple surgical tools by estimating the trajectories of several tools simultaneously present within a video segment and assigning the newly detected objects to the right trajectories. Note that the two deep-learning models operate in tandem in a tracking-by-detection framework, which is designed to link detected objects across a sequence of frames correctly based on the localized bounding boxes of the detected objects. Moreover, the second model is also configured to re-identify tools after they have temporally left the video frames and the corresponding tracks become inactive. Using the disclosed tool tracking model, the MSTT systems and techniques can estimate the trajectory for each of the tracked tools by establishing the (x, y) coordinates continuously for the tracked tool, e.g., for both the left-hand and right-hand tools that a surgeon uses throughout a given surgical step or task. In some embodiments, after generating the trajectories by the disclosed MSTT systems and techniques, the surgeon performance metrics such as path length and derivatives of displacement can be calculated based on these trajectories.

The MSTT systems and techniques are able to estimate the trajectory (i.e., the x and y image locations) of right and left tools that the surgeon uses in each surgical task. The proposed multi-tool tracking framework employs a tracking-by-detection scheme wherein at each new frame, active-used tools are detected and assigned to the existing tracks. The MSTT systems and techniques require two deep-learning models that is trained in advanced: the first one is a “tool detection” model, based on Faster-RCNN model, trained to localize surgical tools at each frame of the video; and the second model is a re-identification (or “re-ID”) model that is trained to distinguish between multiple simultaneously detected tools. The re-ID model is trained to learn feature descriptions of each generated bounding box of a detected tool such that if two bounding boxes belong to the same track, then their feature corresponding descriptors should be close in Euclidean space compared to two feature descriptors of bounding boxes corresponding to two different tracks. The disclosed MSTT systems and techniques allow for tracking more than one surgical tool in a video feed for an extended duration, e.g., from a few minutes to 10s of minutes.

FIG. 1 shows a block diagram illustrating an exemplary multiple surgical tool tracking (MSTT) system 100 for implementing the disclosed user-presence/absence recognition techniques in accordance with some embodiments described herein. As shown in FIG. 1, robotic surgical system 100 can include at least the following functional modules: a video preprocessing module 102, a tool detection module 104, a tool tracking module 106, and a tool re-identification module 108, which are coupled with each other in the order shown. In particular, tool detection module 104 further includes a deep-learning-based tool detection model 114 which has been trained to perform surgical tool localization on video images. Moreover, tool re-identification module 108 includes a deep-learning-based tool re-identification model 116 which has been trained to re-identify a surgical tool in a received video frame that has temporarily disappeared from the video frames.

During operation, the disclosed MSTT system 100 can begin when a video preprocessing module 102 receives a sequence of raw video frames 120. In some embodiments, video preprocessing module 102 includes a function or a submodule to increase the received raw video frames 120 to a frame rate at least equal to a predetermined frame rate, e.g., at 30 frame-per-second (30 fps). In other words, if the incoming frame rate of the raw video frames 120 is below the predetermined frame rate (e.g., incoming frame rate=15 fps), video preprocessing module 102 up-converts the video frames 120 to at least the predetermined frame rate (e.g., to 30 FPS). For example, video preprocessing module 102 can use one of linear interpolation and optic flow technique to perform this upconversion operation. Furthermore, video preprocessing module 102 may also include a function or a submodule to resize each higher resolution image of the received raw video frames 120 to a quarter high definition at 960p×540p. Note that the two functions/submodules for frame rate conversion and image resizing can be performed/applied sequentially in any given order. Moreover, one or both of these two functions or submodules may be omitted. When both of these functions or submodules are omitted, video preprocessing module 102 may be omitted from MSTT system 100. Otherwise, video preprocessing module 102 outputs preprocessed video frames 122.

For each video frame in the received preprocessed video frames 122, tool detection module 104 is configured to apply deep-learning tool detection model 114 on the video frame, and generate one or more detected objects 124 (in the form of localized and classified bounding boxes) as outputs. In some embodiments, deep-learning tool detection model 114 is implemented based on a Faster-RCNN (regions convolutional neural network) architecture. Specifically, such a Faster-RCNN-based detection model has been trained to localize each surgical tool within each frame of the video, such as in each preprocessed video frame 122. In some embodiments, localizing a detected surgical tool within the processed video frame includes generating a bounding box around the end effector portion of the detected surgical tool.

In some embodiments, the tool detection model 114 was trained on a training dataset constructed to include various scenarios of tool configurations/appearances of a given surgical tool, such as a pair of graspers, during a surgical procedure. Note that a given surgical tool can take on different configurations/appearances during a surgery procedure. For example, the jaws of a given tool may be in an open state (which can further vary in terms of a degree of being open) or in a closed state. Moreover, a given tool can vary in camera perspectives in different frames (e.g., in different spatial angles, or in different distances to the camera lens). Furthermore, a given tool can also appear partially occluded, e.g., by another tool or by a tissue. To be able to detect the same surgical tool in such a wide variety of possible scenarios when the surgical tool is in use, the training dataset should also include a diverse set of sample images that cover all of the practical scenarios of the surgical configurations/appearances.

In some embodiments, a set of training surgical videos is collected from gastric bypass and sleeve gastrectomy procedures. Next, images of surgical tools captured in each training video are cropped out and labeled by one or more human annotators to provide the ground truth labels to these surgical tool images. Note that the constructed training dataset can include multiple subsets of labeled training images for multiple surgical tools, wherein each subset of labeled training images is specifically constructed for a unique surgical tool in a wide variety of configurations/appearances. After constructing such a multi-tool detection training dataset, the training dataset is split into a training set (e.g., 80% of the total training dataset) and a validation set (e.g., 20% of the total training dataset). When tool detection model 114 has been trained and validated on such a training dataset, the trained tool detection model 114 can be applied to a real-time video feed to detect multiple surgical tools. For each of the multiple surgical tools, the trained tool detection model 114 is able to detect the surgical tool in different learned configurations/appearances. During deployment, the trained tool detection model 114 continues to generate localized bounding boxes for a given tool, wherein the location and size (in terms of width and height) of the generated bounding boxes can continue to change. In some embodiments, detection model 114 is configured such that each initial tool detection is validated and accepted only when the confidence score associated with the detection is above a predetermined threshold.

After a new tool is detected by tool detection module 104 within a newly processed frame 122, tool tracking module 106 in MSTT system 100 is configured to begin tracking the newly-detected tool through subsequent video frames 122 based on the corresponding localized bounding boxes and the associated tool IDs that continue to be generated by tool detection module 104. Note that tool tracking module 106 includes a deep-learning-based re-ID model 116 configured to process a cropped image within a generated bounding box of a detected tool to determine whether the detected tool belongs to one of the established tracks. In some embodiments, re-ID model 116 has been trained to generate a feature vector of a predetermined dimension, e.g., 128 for the input image to represent the detected tool in the cropped image. The newly generated feature vector can then be compared to previously-generated feature vectors of previously-identified tools to determine if the detected tool belongs to one of the previously-identified tools.

In some embodiments, re-ID model 116 is trained with positive samples/positive training data that are composed of a large collection of positive training image pairs, wherein each pair of the positive training images belongs to the same object. For example, a subset of training image pairs in the positive training data can belong to the same object/tool, but each given image pair in the subset of training image pairs can be composed of two different configurations and/or appearances of the same object/surgical tool during a surgery procedure. For example, the two images of the same object/surgical tool can differ in terms of one or more of: the camera's angles of view, the distances to the camera lens, and a state of the jaws of a given tool, e.g., whether the jaws of the given tool are in an open state or in a closed state, and if in an open state, different degrees of openness of the jaws.

Moreover, re-ID model 116 can further be trained with negative samples/negative training data that are composed of a large collection of negative training image pairs, wherein each pair of the negative training images belongs to two different objects/surgical tools. For example, a subset of training image pairs in the negative training data can belong to a left-hand tool and a right-hand tool in different configurations that simultaneously appear within the same video frames during a surgery procedure.

In some embodiments, after re-ID model 116 has been trained with both the positive training data and the negative training data, re-ID model 116 can then be applied to and process input images of a set of learned objects. The trained re-ID model 116 subsequently generates a feature representation for each processed image of a learned object, such that the feature distance between two input images (calculated based on the two corresponding feature representations) of the same object is small, whereas the feature distance between two input images of two different objects (also calculated based on the two corresponding feature representations) is large. More specifically, re-ID model 116 includes a deep-neural network configured to learn a set of image features of a given object (e.g., a surgical tool) and output a feature representation/vector of the given object (e.g., the surgical tool) using a set of numbers. The training of the deep-neural network using the above-described positive and negative training data ensures that the trained deep-neural network within re-ID model 116 generates two sets of numbers/feature vectors for two objects/surgical tools that have a small feature distance when the two objects/surgical tools are the same object/surgical tool; whereas the trained deep-neural network generates two sets of numbers/feature vectors for two objects/surgical tools that have a large feature distance when the two objects/surgical tools are different objects/surgical tools.

The detailed operations of the trained re-ID model 116 will be described below. In some embodiments, to allow the newly-detected tool to be tracked, tool tracking module 106 can explicitly generate a tracking request for the newly-detected tool. However, tool tracking module 106 can also be configured to automatically trigger a new tracking process in response to detecting a tool in a frame that has not been previously detected (i.e., the assigned tool ID to the detected tool has not been assigned before).

In some embodiments, each new tool-tracking process begins with initiating a track or a tracklet for each unique tool detection from an initial video frame or multiple initial frames. Specifically, tool tracking module 106 can initiate a track/tracklet with a unique track ID, which can be identical to a unique tool ID generated for the detected tool by tool detection module 104. Note that for a multi-tool tracking process, the multiple tools may or may not be initially detected in the same initial video frame. However, if tool detection module 104 detects multiple unique tools from a single initial video frame, tool tracking module 106 can be configured to simultaneously initiate multiple tracks/tracklets corresponding to the multiple uniquely-detected tools (e.g., both the left-hand tool and the right-hand tool). Alternatively, if tool detection module 104 sequentially detects two or more unique tools from a number of initial frames, tool tracking module 106 can be configured to sequentially initiate two or more tracks/tracklets corresponding to the two or more sequentially-detected tools.

Note that a common scenario of having multiple tools in a video segment is when a surgeon simultaneously holds a first tool in the left hand (also referred to as a "left-hand tool" or "left tool") and a second tool in the right hand (also referred to as a "right-hand tool" or "right tool") and operates the left-hand tool and the right-hand tool with both hands. In some embodiments, to initiate two tracks/tracklets for the left tool and the right tool, the initial designations of the left tool or the right tool after detecting both tools in a processed video frame 122 can be directly decided by a user through a manual entry. In other words, a user will review the two new tool detections and specify with an input means, one of the two detections for the left tool and the other detection for the right tool. Subsequently, two tracks/tracklets (consistently referred to as "tracks" below) are initialized for the left and right tools based on the received manual entries from the user. However in other embodiments, tool tracking module 106 may be configured to automatically determine and designate the left tool and the right tool, e.g., based on the relative positions of the two new detections. For example, tool tracking module 106 can automatically designate the detected tool appearing on the left side of the video frame as the left tool, and the detected tool appearing on the right side of the video frame as the right tool. Subsequently, tool detection module 104 is configured to simultaneously track the left tool and right tool by constructing two independent tracks. Note that by correctly initiating the left tool and right tool at the beginning of the multiple tracking process, tool detection module 104 can then separately track the left tool and the right tool in the subsequent video frames, even if the two tools are the same type of tools (e.g., both are graspers).

In various embodiments, the disclosed tool tracking process can begin when at least one track has been initialized or instantiated. However, when more than one track has been initialized (e.g., when both the left-tool track and the right-tool track have been initialized), the tool tracking process becomes a multi-tool tracking process. During a multi-tool tracking process, tool detection module 104 continues to operate as usual, i.e., to process each newly-received video frame 122 and generate localized bounding boxes for the detected tools in the newly-received video frame (also referred to as a "new frame"). Subsequently, for each newly-detected object (also referred to as a "new detection") in the new frame, tool tracking module 106 is configured to determine whether the newly-detected object belongs to one of the existing/established tracks. If so, the new detection can be assigned to one of the established tracks. For example, after the left-tool track and the right-tool track have been established, and when tool detection module 104 generates two localized bounding boxes for two detected tools in a new frame, tool tracking module 106 is configured to assign each of the two new detections to a corresponding left-tool track or the right-tool track. Note that after the assignments of the new detections to the established tracks, the locations of the new detections can be used to update the most-recent tool locations of the established tracks.

In various embodiments, tool tracking module 106 is configured to assign a new detection to a corresponding established track by evaluating a set of metrics. The set of metrics can include: (1) a semantic similarity metric: (2) a spatial similarity metric; and (3) a class-ID/tool-ID matching metric. Specifically, the semantic similarity metric or simply the "semantic similarity" compares image feature similarities between a newly-detected object and stored tool images associated with an existing tracking. The spatial similarity metric or simply the "spatial similarity" compares the location of a newly-detected object with the predicted location of a tracked tool of the established track in the current video frame. The tool-ID matching metric simply compares the tool ID assigned to the newly-detected object with the tool ID associated with an existing/established track. Note that tool tracking module 106 can evaluate the set of metrics for each new detection individually or collectively. In some embodiments, when the set of metrics are evaluated collectively, tool tracking module 106 can use a lost function that combines the set of metrics using a set of weighted loss terms. We now describe each metric of the set of metrics for assigning a new detection to existing tracks in more detail.

Note that the semantic similarity metric is applied by tool tracking module 106 to evaluate whether a newly-detected object from a newly processed video frame/image is sufficiently similar in appearances to a tracked tool associated with an established track. In some embodiments, to perform the semantic similarity evaluation, the generated bounding box for the new detection is used to crop out a corresponding region of the video frame. The cropped image is then fed into re-ID model 116 within tool tracking module 106 to generate a feature vector of the predetermined dimensions/, e.g., 128 dimensions/numbers, or a 128-dimension feature vector. While the 128-dimension feature vector (or simply "128 features") may be used to describe the semantic similarity, other embodiments of re-ID model 116 can be trained to generate a feature vector of other predetermined dimensions, e.g., 64 dimensions or 256 dimensions, without departing from the scope of the present techniques. Because the features/numbers within a given extracted feature vector encode the image features such as shapes, textures of the cropped image, they can be referred to as "semantic features" and the process of generating these feature vectors can be referred to as "semantic features embedding." Because the generated bounding boxes by tool detection module 104 can have different sizes, in some embodiments, tool tracking module 106 is configured to resize each received cropped-image into a common input image size before passing it though re-ID model 116.

For semantic similarity evaluation for a new detection, we assume at least one track has been initialized or instantiated. Because each established track is constructed from a sequence of previously-detected and cropped images of the tracked tool, a set of semantic feature vectors associated with the set of previous detections of the tracked tool has been extracted and become part of the established track, which is stored in a memory. In various embodiments, each established track can have the following attributes: (1) an array of semantic feature vectors corresponding to a set of previous detections of the tracked tool; and (2) an array of predicted locations of the tracked tool corresponding to the set of previous detections of the tracked tool. In an initial frame, the array of semantic feature vectors can be initialized through the semantic features embedded by re-ID model 116, and the center of assigned bounding box is used for initial track location prediction. In some embodiments, each established track can have the following mathematical expression: {'pred' or 'P':[$(x_0, y_0)$, $(x_1, y_1)$, $(x_2, y_2)$, . . . ]; 'semantic_feature' or 'F': [$f_0$, $f_1$, $f_2$, . . . ] }, wherein 'P' is the array of the predicted locations and 'F' is the array of the semantic feature vectors. Note that the two arrays or 'P' and 'F' have element-to-element correspondences. Moreover, the two arrays of the established track also both correspond to the same timing array 'T': [$t_0$, $t_1$, $t_2$, . . . ], wherein the set of time points in 'T' corresponds to a set of timestamps when the set of previous detections were made and the locations in P' and the feature vectors in 'F' were computed.

Hence, the newly-computed semantic feature vector of a newly-detected object can be compared with these historic/stored semantic feature vectors associated with each established track to determine whether the newly-detected object and the previously detected images of the tracked tool are visually similar. In other words, to determine if the newly-detected object belongs to one of the established tracks (e.g., a left-tool track and a right-tool track), a semantic-feature-vector-based comparison is made between the newly-computed semantic-feature-vector and the stored semantic-feature-vectors associated with the established track, referred to as the "semantic similarity comparison" or the "the semantic similarity metric." Note that the semantic similarity metric or the semantic similarity comparison is one of the key decision-making mechanisms in the proposed multi-tool tracking system. Note that this semantic similarity metric can be quite effective in such scenarios when multiple objection detections are made in the middle of or a similar location within a given frame so that the spatial similarity metric cannot be reliably used to assign the multiple detentions to the corresponding established tracks. Moreover, the semantic similarity metric plays a highly important role in the tool re-ID portion of the multi-tool tracking system. For example, after a tracked tool has been moved temporally out of the camera's field of view (FOV), and then the same tool re-enters the camera's field of view, the semantic similarity metric can be used to ensure that the new detection of the re-emerged tool belongs to the previously-established track of the same tool.

In some embodiments, a Euclidean distance can be computed between the newly-computed semantic-feature-vector and the historic semantic-feature-vectors associated with the established track. In a particular embodiment, given a new detection d, at a timestamp t and an existing track k, we also denote $f_d$ as the extracted semantic-feature-vector from the corresponding bounding box. It is also assumed that the existing track k is associated with an array F of extracted semantic-feature-vectors of the detected tool from an initial timestamp 0 to a timestamp t−1, wherein F=[$f_0$, $f_1$, . . . , $f_{t-1}$]. Euclidean distance between $f_d$ and each of the feature detectors in the array F is first calculated. The set of computed semantic distances can then be sorted in an increasing or decreasing order, wherein a larger semantic distance represents a smaller/weaker similarity. Next, the average of a predetermined portion/subset (e.g., 10%) of the similarity data (i.e., the computed Euclidean distances) can be used as the semantic distance/similarity between the track k and new detection d.

In some embodiments, the computed semantic distance/similarity is further compared with a predetermined semantic-similarity threshold in terms of a threshold distance value. If the computed semantic distance is greater than the semantic-similarity threshold, it is a strong indicator that the newly-detected object does not belong to the given track. However, if the computed semantic distance is smaller than the semantic-similarity threshold, it still may not be sufficient to assign the newly-detected object to the given track. For example, it is possible that two concurrently tracked tools are of the same type so that they have very similar appearances (and therefore small computed semantic distances). Hence, it is necessary to also compare the spatial similarity between the location of the newly-detected object and the given track.

In some embodiments, when computing the semantic similarity metric between the newly-detected object from a current/newly-processed frame and the established track, tool tracking module 106 is configured to compare the newly-detected object with the previous detections of the tracked tool associated with the established track in the last N processed frames immediately before the current frame, instead of just comparing with the last frame immediately before the current frame, wherein N is an integer number. In some embodiments, N processed frames correspond to between 1 to 10 seconds of the processed frames, e.g., N can be around 100 for a video frame rate of 25-30 fps. As a result, the last N processed frames may be referred to as the "short-term memory." One reason that tool tracking module 106 takes into account the short-term memory instead of only the last frame in the established track is that an actively-tracked tool can have occlusions from tissues, other tools, and other artifacts. As such, only comparing with the last frame in the established track or even the last few frames in the established track runs the risk of encountering a fully or partially occluded tool, which leads to the loss of tracking accuracy. Moreover, in the case when both the left tool and right tool are of the same tool type, e.g., both being graspers, it becomes more challenging for the re-ID model to distinguish between these two tools when the semantic similarity comparison is only made with the last frame of the established track. However, when the semantic similarity comparison is made to include a longer history of the processed frames, detection accuracy can be significantly improved.

Note that a "detection gap" can exist in an active track when the tracked tool is temporarily out of the view and "lost" in the frames, e.g., due to one of the above-described occlusions. During such a detection gap, no meaningful historic data can be generated and stored for further comparison (i.e., no corresponding bounding boxes are generated). Such detection gaps can be as long as a few seconds of the video. In some embodiments, tool tracking model 106 is configured such that the semantic similarity comparisons are made with the short-term memory of the stored semantic-feature-vectors while avoiding such detection gaps. To do so, each detection gap longer than a predetermined time interval (e.g., longer than 1-second) is tracked and recorded/marked as a part of the established track. Hence, when making semantic similarity comparisons with the short-term memory, tool tracking module 106 can be configured to identify such a marked detection gap positioned immediately before or in the vicinity of the current frame. If such a detection gap is identified, tool tracking module 106 can trace further back to a timestamp/temporal location right before the detection gap, and start making semantic similarity comparisons with N previous detections of the tracked tool before the detection gap when the tracked tool has been positively detected. In other words, in these embodiments, the semantic similarity comparisons are made with the latest N processed frames when actual/positive detections of the tracked tool are made (the actual/positive detections are characterized with the cropped images and represented by the generated/stored semantic feature vectors and locations of the corresponding bounding boxes).

Returning to tool tracking module 106 in FIG. 1, in some embodiments, assigning a newly-detected object to one of multiple established tracks requires combining the evaluations of the semantic similarity metric and the spatial similarity metric. When considered separately, the spatial similarity metric is used to determine whether the location of the newly-detected object matches the latest predicted location of a tracked tool in an established track. From a tool tracking perspective, the spatial similarity metric is used to ensure that the new detection is sufficiently close to the expected/predicted location of tracked tool based on the established track. For example, if an established track is tracking the right-hand tool, the new detection of the same tool in the current frame will most-likely appear on the right side of the frame. When there are multiple established tracks, the spatial similarity metric can be applied to each of the established tracks. For example, when there is a left-tool track and a right-tool track, a first newly-detected object located on the left side of the video image/frame is more likely associated with the left-tool track, whereas another newly-detected object located on the right side of the same video image/frame is more likely associated with the right-tool track. In other words, it is generally assumed that there is no significant jump/sudden change in locations of a tracked tool from the immediate proceeding frame to the current frame or between two consecutive frames.

In some embodiments, tool tracking module 106 may apply a predetermine spatial-distance threshold to the spatial similarity metric to determine if the location of a newly-detected object (i.e., the new detection) is sufficiently similar/close to the expected/predicted location of a tracked tool based on an established track. In some embodiments, if the spatial distance between the location of the new detection and an expected/predicted location of a given established track among multiple established tracks is greater than the predetermined spatial-distance threshold, a very large weight will be given to the potential assignment of the new detection to the given established track.

Note that the location of the detected tool 124 from tool detection module 104 is already known from the associated bounding box. For example, tool tracking module 106 can use the center of the generated bounding box as the location of the detected tool. In some embodiments, tool tracking module 106 may use the center of the right edge of the generated bounding box the location of the location of the detected tool. Separately, tool tracking module 106 may use a Kalman filter to predict the new position/location of a tracked tool in the current frame. Note that the size of the bounding box of a tracked tool tends to change from frame to frame due to a number of dynamic factors, such as perspective changes of the tool due to tool movement, change in the perspective of the camera, change in jaw actions (i.e., open jaw vs. closed jaw), and a combination of the above. As a result, it has been found that using the center of the bounding box as the location of the detected tool over using an edge point of the bounding box can achieve better tracking performances. Hence, the center of the bounding box of a newly-detected object can be used to compare with the expected/predicted location of a tracked tool in the corresponding track.

In some embodiments, to simultaneously track multiple tools through a sequence of video frames using multiple established tracks (e.g., a left track and a right-tool track) and based on multiple assignment metrics (including the semantic similarity metric and the spatial similarity metric), tool tracking module 106 uses a data association technique to attempt to assign each newly-detected tool within a new frame to an established track in the multiple established tracks. In some embodiments, the data association technique includes a Hungarian method which is configured to assign the newly-detected tools to their corresponding tracks in the multiple established tracks. In some embodiments, the objective of the proposed Hungarian method is to minimize the total cost for all of the new detections within the current/newly-processed frame rather than minimizing element-wise cost (i.e., for each new detection within the current/newly-processed frame). In these embodiments, a total cost function for all of the detections within the current/newly-processed frame and for all of the multiple established tracks is constructed and minimized. For example, if there are 3 detected objects in the current frame, and 3 existing tracks, a single cost function can be constructed for the 3 detected objects and 3 existing tracks, so that the proposed Hungarian method will attempt to simultaneously assign each of the 3 detected objects to a right track in the 3 existing tracks by minimizing the single/total cost function.

$$\mathrm{cost}(t,d)=D_{feat}(t,d)+M\cdot \mathbb{1}_{D_{spatial}(t,d)>\lambda_{sp}}+M\cdot \mathbb{1}_{d\cdot DetClass\neq t\cdot classID} \quad (1)$$

Mathematically, to be able to associate the multiple detected objects with the multiple established tracks, a cost matrix between each active track t and each new detection d may be first constructed. Next, the cost matrix is minimized using the Hungarian algorithm. The cost function is defined in Eqn. 1, which is a combination of (1) semantic similarity metric, (2) the spatial-distance similarity metric, and (3) detection ID and track ID matching.

$$\mathrm{cost}(t,d)=D_{feat}(t,d)+M\cdot \mathbb{1}_{D\sim patial(t,d)>\lambda_{sp}}+M\cdot \mathbb{1}_{d.DetClass\neq t.classID} \quad (1)$$

wherein t denotes a track, d denotes a detection. In Eqn. 1, the first term on the right hand side $D_{feat}(.,\ .)$ represents the semantic dissimilarity between image feature associated with track t and image features of detection d. As described above, to achieve a real-time performance and adapt to the appearance changes of a track across a sequence of frames, a short-term memory is considered wherein a predetermined number of N recent frames of the given track are used to compare the feature distance to a new detection d in the semantic feature embedding space. The second term in Eqn. 1 represents the spatial distance between the center of detection d and the latest predicted location of the track t (e.g., by using a Kalman filtering technique). Here an assumption is made that surgical tools only move slightly between consecutive frames, which is a reasonably safe assumption under a sufficiently high frame rates, e.g., 25-30 fps. The expression in the second term also indicates that, if the spatial distance is greater than a predetermined distance threshold $\lambda_{sp}$, then the corresponding element in the cost matrix is given a very high weight to prohibit such an assignment from happening. The third term in Eqn. 1 factors in between the class label of the track (or "track ID") and the class label of the detected tool (or "tool ID"), and hence may be referred to as the "class ID" match term. In the particular expression, the third term in Eqn. 1 adds a very high bias, e.g., M=1000 to the total cost if the class label of the detection does not match the class label of the given track, thereby prohibiting such an assignment from happening.

To solve the cost function of Eqn. 1 using the Hungarian method, a bipartite graph can be constructed wherein the nodes of the bipartite graph are the new detections and the latest predictions for the existing tracks. In this graph, there is an edge connection each new detection and each existing track. Each edge of the graph is also assigned a weight calculated based on the computed semantic similarity and spatial similarity metrics between the new detection and the existing track. After constructing the bipartite graph based on the new detections, the latest predictions for the existing tracks, and the computed semantic similarity and spatial similarity metrics, a bipartite matching is performed to generate the accurate assignments of the new detections in the newly processed frame to the corresponding tracks.

Further referring to MSTT system 100 of FIG. 1, note that tool tracking module 106 is followed by tool re-identification module 108 configure for track recovery, i.e., attempting to assign a new detection to an inactive track. In some embodiments, tool re-identification module 108 receives any new detection that cannot be assigned to any active track at the end of the data association operations by tool tracking module 106, referred to as the unassigned detections 126. Re-identification module 108 is configured to determine whether a received unassigned detection is associated with a tool that was previously tracked in an established track but becomes occluded or moves out of the screen (which also causes the associated established track to become an inactive track). If so, re-identification module 108 attempts to recover such a previously-established track that has been inactive. In some embodiments, re-identification module 108 can use a modified cost function based on Eqn. (1) to assign an unassigned detection d to any inactive track t which is expressed below.

$$\text{cost}(t,d)=D_{feat}(t,d)\cdot M\cdot \mathbb{1}_{D_{spatial}(t,d)>\lambda_{sp}\wedge d\cdot DetClass\neq t\cdot classID} \qquad (2)$$

Note that one modified cost function Eqn. (2) can be constructed between each unassigned detection d to each inactive track t. The intuition behind the modified cost function Eqn. (2) is that, if a tool emerges from an occluded organ, the detection module 102 usually fails to correctly identify the tool as the "missing" tool and therefore would also fail to assign the original tool ID associated with the missing tool. However, it is reasonable to assume that the location of the new detection of the missing tool within the frame is close to the last known location of the inactive track. Consequently, a small spatial distance computed from the last known location can be reliably used to re-assign the unassigned detection to the inactive track. Generally speaking, modified cost function Eqn. (2) to assign a new detection to any inactive track is stricter than cost function Eqn. (1) to assign a new detection to an active track. This is achieved by generating a very high cost value (which naturally prohibits an assignment) if the new detection class ID does not match or the class ID of an inactive track, or if the new detection and the last known location of an inactive track are spatially far apart from each other. However, if the new detection can pass both of the above two similar tests, then a reassignment of the new detection to the inactive track can be made.

Figure 2A:
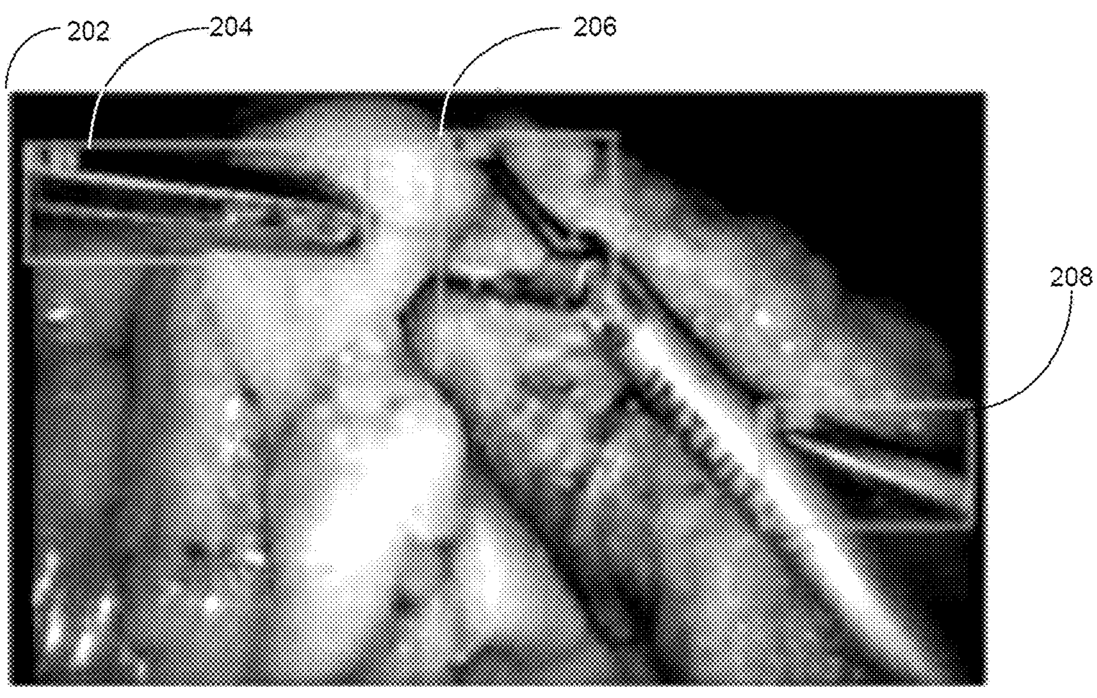
FIG. 2A shows an exemplary processed current frame by the disclosed tool detection module that includes three newly detected objects in accordance with some embodiments described herein.
Figure 2B:
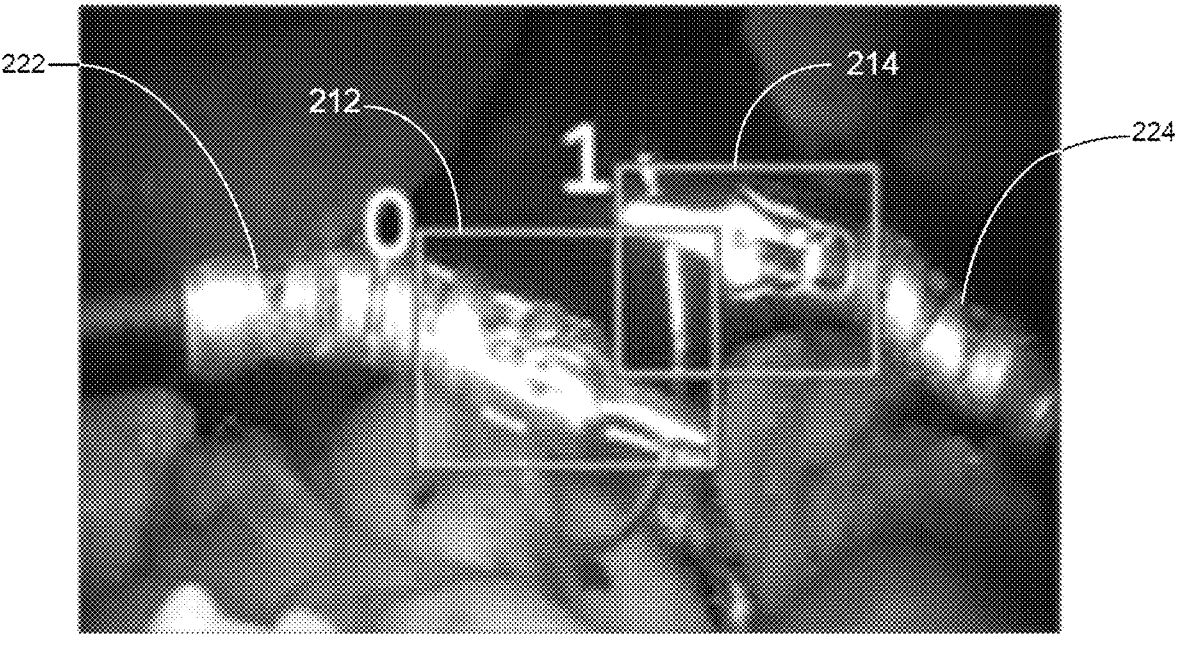
FIG. 2B shows exemplary outputs of the disclosed tool track module after assigning two newly-detected objects to the corresponding left tool and right tool at a given time-stamp in accordance with some embodiments described herein.

FIG. 2A shows an exemplary processed current frame 202 by tool detection module 104 that includes three newly detected objects in accordance with some embodiments described herein. As can be seen in FIG. 2A, processed frame 202 includes three generated bounding box 204, 206, and 208 framing the end effectors parts of three detected surgical tool objects. FIG. 2B shows exemplary outputs of tool track module 106 after assigning two newly-detected objects 212 and 214 to the corresponding left tool 222 and right tool 224 at a given timestamp in accordance with some embodiments described herein. As can be seen in FIG. 2B, the first detected object/bounding box 212 is successfully assigned to left tool 212, and the second detected object/bounding box 214 is successfully assigned to right tool 224.

Figure 3:
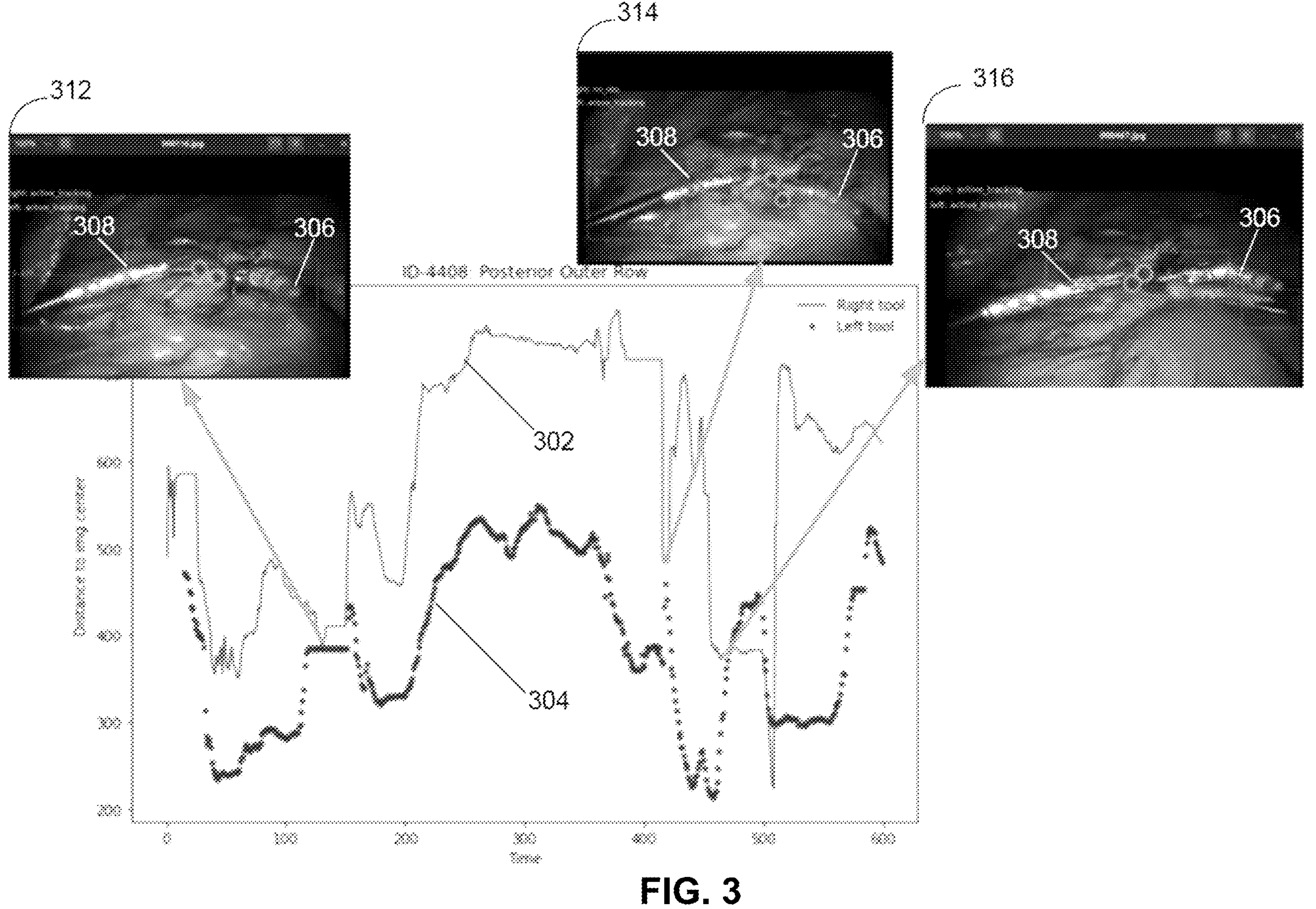
FIG. 3 shows two exemplary established tracks generated by the disclosed MSTT system that tracks a right-hand tool and a left-hand tool in accordance with some embodiments described herein

FIG. 3 shows two exemplary established tracks 302 and 304 generated by the disclosed MSTT system 100 that tracks a right-hand tool 306 and a left-hand tool 308 in accordance with some embodiments described herein. As can be seen in FIG. 3, track 302 is constructed for the right-hand tool 306, whereas track 304 is constructed for the left hand tool 308. FIG. 3 also shows that the disclosed MSTT system 100 is capable of correctly distinguishing the left-hand tool and the right-hand tool at three instances when the two tools are extremely close to each other and assigning the two new detections in each of the instances to the right track. Note that the exemplary tracking process of FIG. 3 also demonstrates that the disclosed MSTT system 100 is capable of tracking the multiple tools for an extended time period, e.g., >10 minutes in this example.

Figure 4:
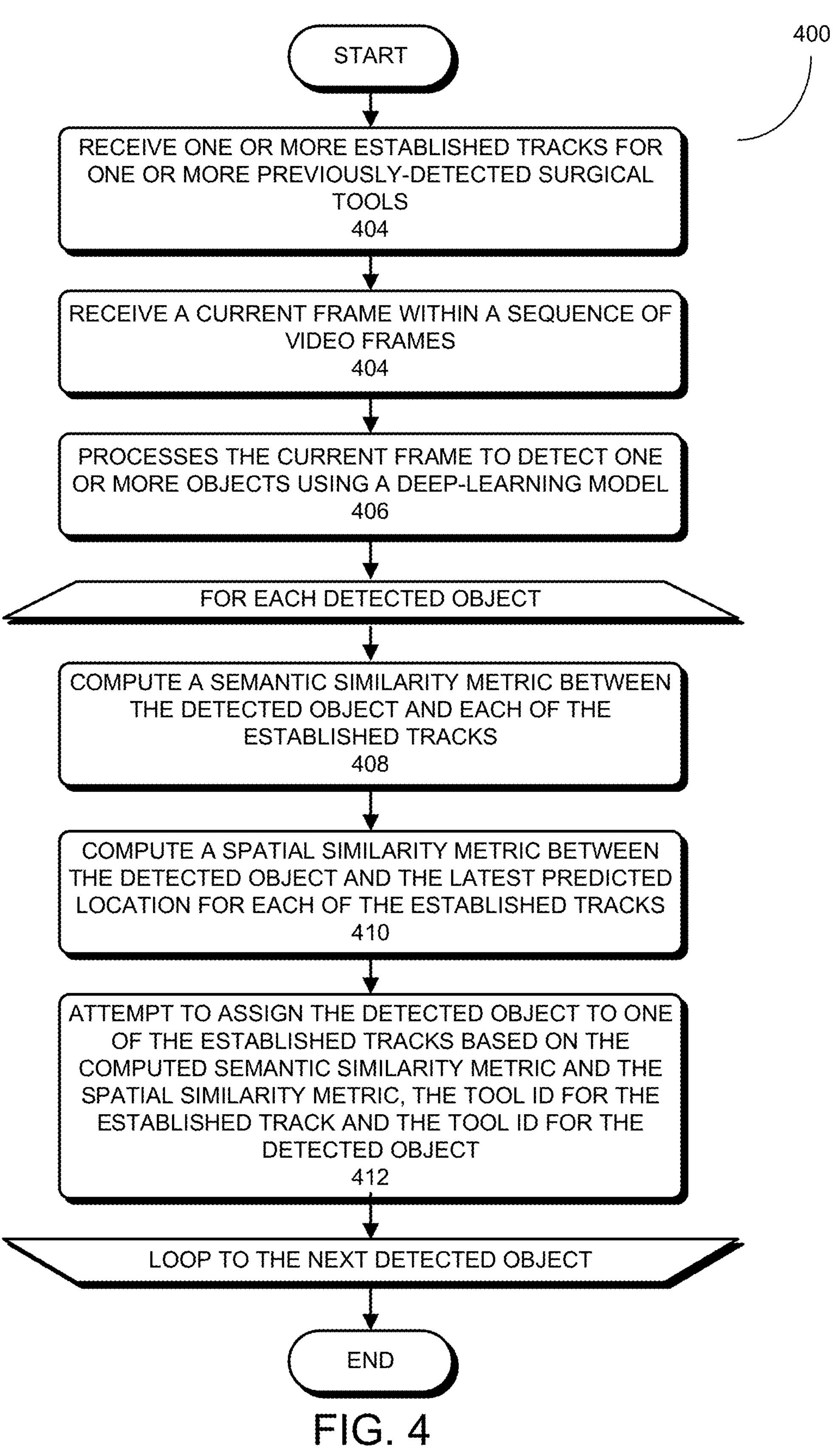
FIG. 4 presents a flowchart illustrating an exemplary process for tracking one or more surgical tools through a sequence of video frames of a surgical video in accordance with some embodiments described herein.

FIG. 4 presents a flowchart illustrating an exemplary process 400 for tracking one or more surgical tools through a sequence of video frames of a surgical video in accordance with some embodiments described herein. In one or more embodiments, one or more of the steps in FIG. 4 may be omitted, repeated, and/or performed in a different order. Accordingly, the specific arrangement of steps shown in FIG. 4 should not be construed as limiting the scope of the technique.

Process 400 may begin by receiving one or more established tracks for one or more previously-detected surgical tools (step 402). In some embodiments, the one or more previously-detected surgical tools are detected by a Faster-RCNN model trained to localized and classify a set of diverse types of surgical tools within a given video frame of a surgical video. In some embodiments, the Faster-RCNN detection model is trained to simultaneously detect and classify two surgical tools of the same type (e.g., a left-hand grasper and a right-hand grasper) within a given video frame.

Process 400 subsequently receives a current frame within a sequence of video frames (step 404) and processes the current frame to detect one or more objects using the same deep-learning model (step 406). Next, process 400 next computes a semantic similarity metric between each of the detected one or more objects and each of the established tracks (step 408). In some embodiments, process 400 computes the semantic similarity metric by first extracting a set of image features from the detected one or more objects using a re-identification (re-ID) model. Process 400 then computes the semantic similarity metric by comparing the set of extracted image features with multiple sets of historic image features associated with the established track to determine whether the newly-detected object and the detected tool associated with the established tracks are visually similar to each other. In some embodiments, the set of image features forms a feature vector with 128 dimensions.

Process 400 additionally computes a spatial similarity metric between each of the detected one or more objects and the latest predicted location for each of the established tracks (step 410). In some embodiments, prior to computing the spatial similarity metric, process 400 first receives a center location on the generated bounding box for the detected object. Process 400 further computes the latest predicted location for the established track by applying a Kalman filter to the received center location of the detected object and the last known location of the established track. Subsequently, process 400 attempts to assign each of the detected one or more objects to one of the one or more established tracks based on the computed semantic similarity metric and the spatial similarity metric for the detected object, the tool ID for the established track and the tool ID for the detected object (step 412). In some embodiments, to assign a given detected object to one of the established tracks, process 400 uses a data association technique on the computed semantic similarity metrics and the spatial similarity metrics between the given detected object and the one or more established tracks. Specifically, the data association technique employs a Hungarian method that is configured to identify a correct track assignment of the detected object by minimizing a cost function of the assignment between the given detected object and the one or more established tracks. In some embodiments, process 400 a bipartite graph to solve the cost function associated with each detected object.

Figure 5:
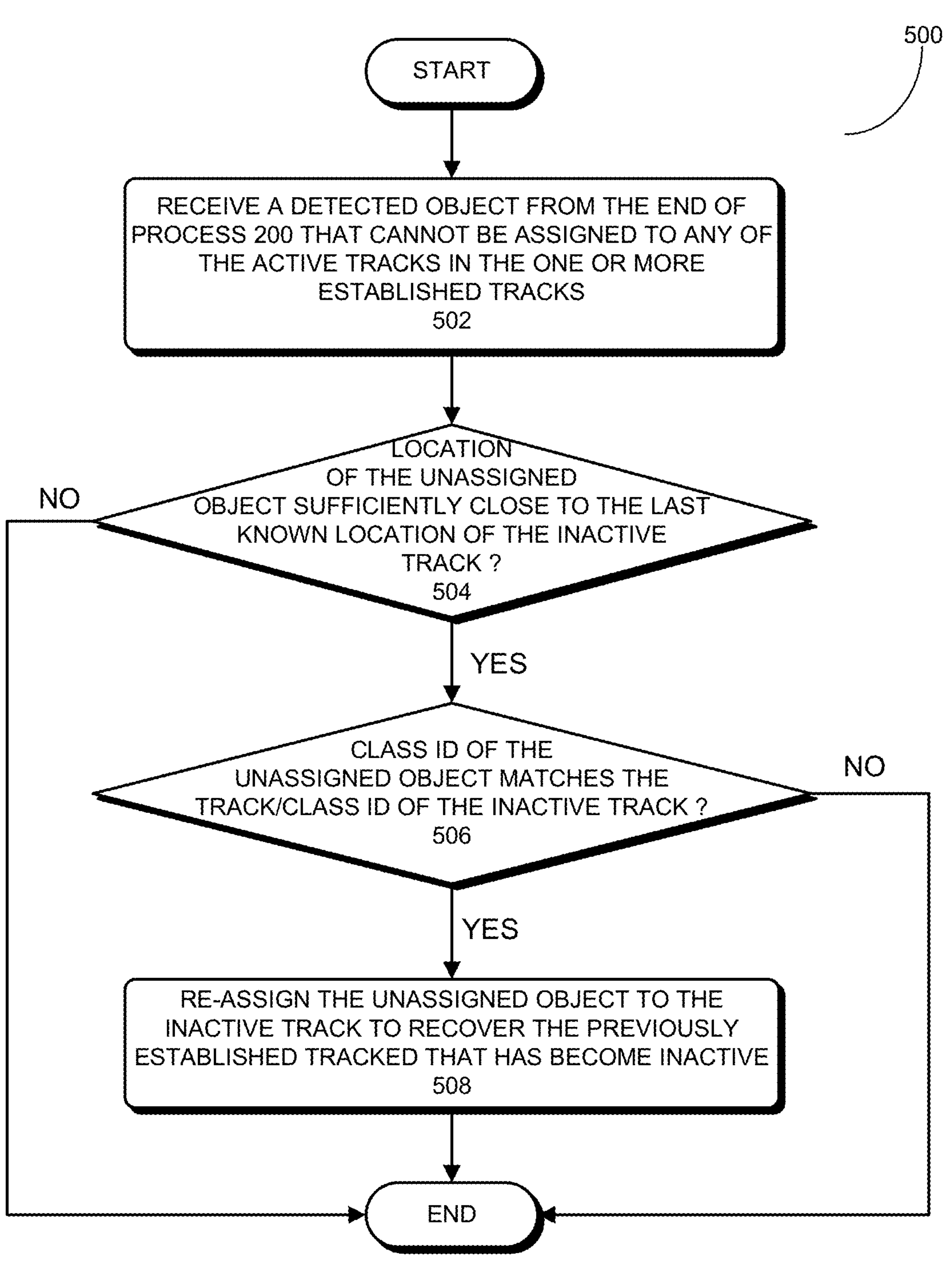
FIG. 5 presents a flowchart illustrating an exemplary process for attempting to recovery an inactive track previously established in accordance with some embodiments described herein.

FIG. 5 presents a flowchart illustrating an exemplary process 500 for attempting to recover an inactive track previously established in accordance with some embodiments described herein. In one or more embodiments, one or more of the steps in FIG. 5 may be omitted, repeated, and/or performed in a different order. Accordingly, the specific arrangement of steps shown in FIG. 5 should not be construed as limiting the scope of the technique.

Process 500 may begin by receiving a detected object from the end of process 400 that cannot be assigned to any of the active tracks in the one or more established tracks (step 502). Note that an established track can become an inactive track when the associated surgical tool is temporarily occluded by an organ or temporarily moves out of the video frames. Next, process 500 determines if the location of the unassigned object is sufficiently close to the last known location of the inactive track (step 504). If not, process 500 terminates. However, if the location of the unassigned object is sufficiently close to the last known location of the inactive track, process further determines if the class ID associated with the unassigned object matches the track/tool ID of the inactive track (step 506). If not, process 500 terminates. However, if the class ID of the unassigned object matches the track/tool ID of the inactive track, process 500 re-assigns the unassigned object to the inactive track to recover the previously established track that has become inactive (step 508).

FIG. 6 shows an Algorithm 600 that summarizes the disclosed multi-tool/object tracking and the disclosed track-recovery/re-ID techniques based on the concept of tracking-by-detection in accordance with some embodiments described herein. As can be seen in the first portion of Algorithm 600, at each frame, objects/tools are detected in the frame independent of other frames. Next, each detected object/tool is passed through a re-Identification (i.e., re-ID) network to extract an appearance feature. Furthermore, for each active track, the locations of the corresponding tool are predicted using a Kalman filter. All of the above information is used to construct a cost matrix which is fed to the Hungarian algorithm to assign new detections to the active tracks. As a result, one or more tracks are created by linking the corresponding detections over a time period. Note that the second portion of Algorithm 600 is for track recovery, which is used for matching unassigned detections from the first portion of Algorithm 600 to some inactive tracks if it is possible to do so.

Feature-Based Surgeon Skill Assessment

After generating the tracks/trajectories (also referred to as the “paths”) using MSTT system 100 for one or more tracked surgical tools in a surgical video that capture the surgical motions of the surgeon, each generated tool-motion track/trajectory (also referred to as “motion track” below) can be decomposed into (x, y) coordinates in the two-dimensional (2D) pixel space of the video frames. Next, these 2D-coordinates/positions of the tool trajectories and the variations of these 2D-positions overtime can be used to compute a set of tool motion properties/metrics that characterize the paths/trajectories of the tracked tools and hence the surgical motions. In some embodiments, the set of tool motion metrics (or simply “motion metrics”) can include following metrics: the distance (i.e., path length), the velocity, the acceleration, the jerk, the curvature, the tortuosity, the turning angle, and the motion ratio. Moreover, the set of motion metrics can be computed at each time-step/time-step. Generally speaking, the distance metric can be computed first as the distance between a pair of 2D-coordinates corresponding to the current time-step and the immediately-preceding time-step. Next, the velocity, the acceleration, and the jerk metrics, which measure the tool speed, the tool acceleration, and the tool jerk, respectively, can be sequentially computed based on the newly computed distance metric.

Separately, the curvature, the tortuosity, the turning angle, and the motion ratio metrics can be computed at each time-step after the new 2D-coordinates of the track/tool location have been determined for the current time-step/time-step. Specifically, the curvature metric measures the straightness of the path/trajectory, which can be calculated at each time-step. The tortuosity metric measures how much the path/trajectory deviates from a straight line, which is typically calculated as the ratio of the length of the path/trajectory between two end points of the path/trajectory to a straight line connecting the same two end points. The turning angle metric measures the direction of tool movement with respect to both a previous time-step and a next time-step. Finally, the motion ratio metric measures the ratio of the amount of time the tool is in motion to the total time of the surgical task.

Note that after computing the set of metrics at each new time-step, a set of corresponding statistical values (or "stats") can be determined and/or updated based on the set of newly-computed motion metrics at the new time-step. For example, for the distance metric, the corresponding statistical value can be the cumulative sum of the total distance captured by the motion track between the initial time-step and the current time-step. However, for the velocity, the acceleration, the jerk, the curvature, the tortuosity, and the turning angle metrics, the corresponding statistical values can be continuously determined or updated as the median or average values of the corresponding metrics over the entire path/trajectory between the initial time-step and the current time-step. FIG. 11 summarizes the above-described set of motion metrics, their simple definitions, and the manners of computing the corresponding stats in accordance with some embodiments described herein. After extracting the set of motion metrics and determining the corresponding statistical values, a feature-based skill assessment technique can be applied to the set of statistical values to generate the surgeon's skill assessments.

In some embodiments, the proposed feature-based skill assessment is configured to classify surgeon's skill based on a corresponding tool track by applying a random forest model on the set of above-described motion metrics extracted from the tool-motion track. Note that this random forest model is trained to take the set of computed motion metrics from the track as input and predict either a "high-skill" class or a "low-skill" class for the surgeon based on the set of input motion metrics of the track.

More specifically, the random forest model further creates a large number of decision trees, e.g., in the number of a few hundreds to more than one thousand, wherein each decision tree is configured to randomly sample a subset of input motion metrics/features. In some embodiments, two of the set of motion metrics/features described above will be randomly selected as the inputs to each of the large number of decision trees (or "the ensemble of decision trees"). Then, each decision tree will learn from the received metrics/features at best of its ability, to classify the inputs as one of the High and Low skill classes. In other words, each decision tree in the ensemble of decision trees operates independently from other decision trees by using a small subset of the extracted motion metrics/features to make a high-skill decision or low-skill decision at the best of its ability. Next, the random forest model makes a collective decision across the ensemble of decisions generated by the ensemble of individual decision trees. For example, the collective decision can be made based on a percentage of high-skill class votes among the ensemble of decisions vs. a percentage of low-skill class votes among the ensemble of decisions, wherein the two computed percentage values can be used as the confidence levels for classifying the surgeon's skill as either the high-skill class or the low-skill class.

Note that the disclosed feature-based deep-learning skill-assessment technique, which may also be referred to as the "feature-based comparator model," can be used to provide a baseline prediction output for comparing with the below-described transformer-based deep-learning skill-assessment technique. Note that existing feature-based skill-assessment techniques make skill assessments/predictions based on the tool motion metrics/features computed from the kinematic data generated by sensors (e.g., accelerometers) inside the robots. In contrast, the disclosed feature-based comparator model makes skill assessments/predictions based on the surgical videos and more specifically, the above-described tool tracks/trajectories constructed out of sequences of video frames, without using the kinematic data from the robot.

Figure 7:
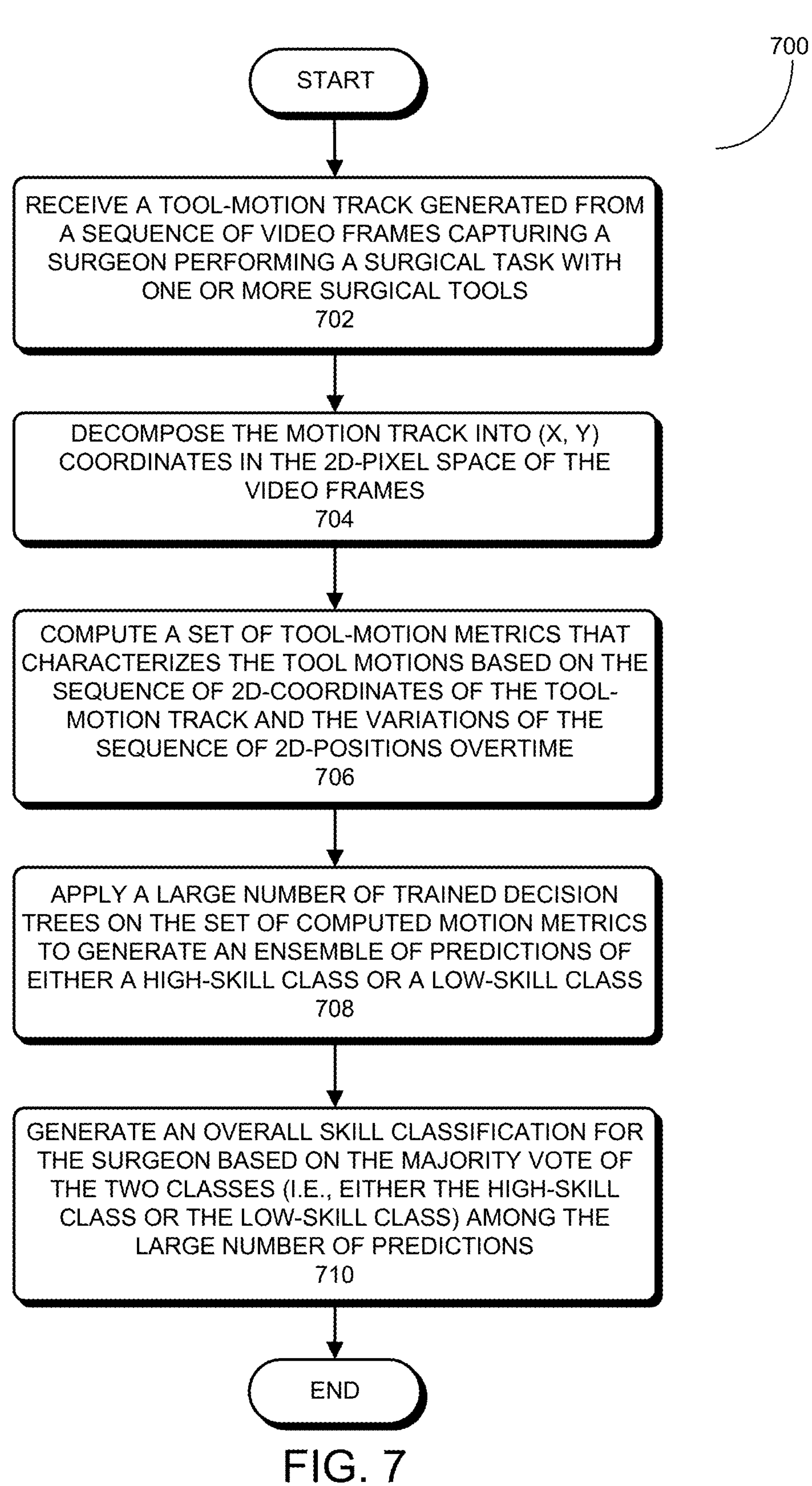
FIG. 7 presents a flowchart illustrating an exemplary process for performing feature-based surgeon skill assessment using a tool-motion track generated based on a surgical video in accordance with some embodiments described herein.

FIG. 7 presents a flowchart illustrating an exemplary process 700 for performing feature-based surgeon skill assessment using a tool-motion track generated based on a surgical video in accordance with some embodiments described herein. In one or more embodiments, one or more of the steps in FIG. 7 may be omitted, repeated, and/or performed in a different order. Accordingly, the specific arrangement of steps shown in FIG. 7 should not be construed as limiting the scope of the technique.

During operation, process 700 receives a tool-motion track generated based on a sequence of video frames capturing a surgeon performing a surgical task with one or more surgical tools (step 702). In various embodiments, the received tool-motion track is generated by the disclosed MSTT system 100. Next, process 700 decomposes the motion track into (x, y) coordinates in the 2D-pixel space of the video frames (step 704). Next, process 700 computes a set of tool-motion metrics that characterizes the tool motions based on the sequence of 2D-coordinates of the motion track and the variations of the sequence of 2D-positions overtime (step 706). As motioned above, the set of tool motion metrics can include the following metrics: the distance (i.e., path length), the velocity, the acceleration, the jerk, the curvature, the tortuosity, the turning angle, and the motion ratio. Moreover, the set of motion metrics can be computed at each time-step corresponding to each video frame in the sequence of video frames. Next, process 700 applies a large number (e.g., 100 or more) of trained decision trees on the set of computed motion metrics to generate a large number of predictions of either a high-skill class or a low-skill class for the surgeon (step 708). Specifically, each decision tree in the large number of trained decision trees makes a corresponding skill-class prediction based on a randomly-selected subset of the set of computed motion metrics, e.g., randomly-selected two metrics out of the set of motion metrics as input to the decision tree. Process 700 subsequently generates an overall skill classification for the surgeon based on the majority vote of the two predicted classes (i.e., either the high-skill class or the low-skill class) among the large number of predictions (step 710).

Learning-Based Surgeon Skill Assessment

In some embodiments, each generated track by MSTT system 100 can be mathematically represented by a temporal array comprising a sequence of feature matrices. More specifically, one dimension of the temporal array is a sequence of time-steps corresponding to the set of predicted locations of the tool in the track. At each time-step, the temporal array further includes a feature matrix that is composed of at least the following information: (1) the timestamp; (2) the 2D location (i.e., the X and Y coordinates) of the detected tool in the corresponding video frame determined at the time-step; and (3) the size/area of the bounding box of the detected tool at the time-step. As such, the sequence of feature matrices that represent the track is a multi-channel one-dimensional (1D) signal. In some embodiments, the feature matrix can also include: (4) a temporal mask indicating tool present/absence. Note that this temporal mask parameter may be used because there can be time periods that the tool is not present on the screen but was later recovered, which lead to empty spots or empty spaces with undefined feature matrices in the generated track. Note also that it is not desirable to feed a track containing empty/undefined feature matrices into a feature-based skill-assessment model. The temporal mask parameter in the feature matrix can be used to indicate to the skill-assessment model whether or not the tool is present on the screen at each given time-step, or for a sequence of time-steps. More specifically, the temporal mask parameter for a given track can have a "1" or "TRUE" value for those time-steps when the tool is present on the screen, and have a "0" or "FALSE" value for those time-steps when the tool is absence on the screen. Note that this temporal mask parameter can be used as an additional input channel to the disclosed deep-learning-based skill-assessment model.

Figure 8:
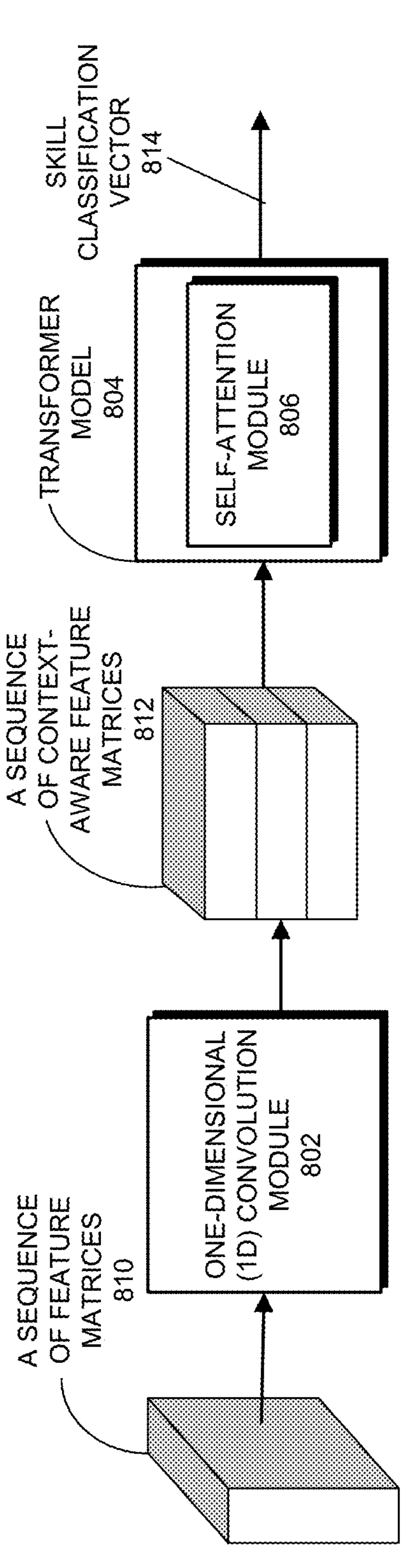
FIG. 8 shows a block diagram illustrating a learning-based skill assessment system which performs surgeon skill classifications by directly processing a generated track without relying on the extracted motion features in accordance with some embodiments described herein.

FIG. 8 shows a block diagram illustrating a learning-based skill assessment system 800 which performs surgeon skill classifications by directly processing a generated track without relying on the extracted motion features in accordance with some embodiments described herein. As can be seen in FIG. 8, a temporal sequence of feature matrices 810 representing a generated track is the input to the proposed deep-learning-based skill-assessment system 800 that is composed of at least a one-direction (1D) convolution module 802 and a transformer model 804. 1D convolution module 802 receives the sequence of feature matrices 810 as input, which is then convoluted with a kernel of a predetermined time length by 1D convolution module 802 to generate a learned feature representation of the input track.

More specifically, 1D convolution module 802 is configured to compare by 1D convolution operations, the multi-channel feature matrix of each given time-step with multi-channel feature matrices associated with a number of neighboring/adjacent time-steps to the given time-step, wherein the neighboring time-steps can include adjacent time-steps both before and after the given time-step. Note that this convolution operation generates a context-aware multi-channel feature representation/matrix (or "context-aware feature representation" below) for the given time-step that is based on both the feature matrix of the given time-step and feature matrices associated with a number of temporally-connected time points. As a result, 1D convolution module 802 generates a larger context-aware feature representation for each original feature matrix in the input feature matrices 810. Note that 1D convolution module 802 essentially acts as a projection layer to project each multi-channel feature matrix at a given time-step into the larger context-aware feature representation that embeds an amount of learned relationships to the adjacent time-steps both before and after the given time-step. As such, 1D convolution module 802 serves to learn short-range relationships of tool locations from the tool-motion track, which represent atomic motions of the tool. In some embodiments, 1D convolution module 802 is configured with a single convolution layer, wherein the weights in the convolution layer are learned by optimizing a cross-entropy loss function to classify surgeon skill using a predefined skill criterion.

In the proposed learning-based skill-assessment system 800, the sequence of context-aware feature representations 812 generated by 1D convolution module 802 is fed into a transformer model 804, which is configured to process the sequence of context-aware feature representations 812 to make a decision on the surgeon's skill classifications. Note that surgical motions and therefore surgeon's skill information are now embedded/encoded in the sequence of context-aware feature representations 812. However, it is understood that each generated motion track that has been encoded in feature representations 812 can include both (1) surgical motions that are highly relevant and indicative to the surgeon's skill and (2) other motions and/or time periods that are less relevant or not relevant to the surgeon's skill. Note that the types of motions encoded in the sequence of feature representations 812 that are deemed important and highly relevant to the surgeon's skill can include specific manners the tool is being moved. The proposed transformer model 804 is configured to infer the surgeon's skill based at least on how smoothly (e.g., the smoothness of the motion) the tool is being moved. For example, transformer model 804 can be configured to recognize when surgeon moving the tool with fluid and smooth motions as indicators of good skills. Transformer model 804 is also configured to recognize when surgeon moving the tool with jerking and stuttering motions, and/or with halts and hesitations as indicators of poor skills.

However, portions of the input feature representations 812 can be associated with events in the track that are less relevant or not relevant to the surgeon's skill. For example, such events can include idle periods when tool movements are minimal or have stopped. Note that these idle periods can be captured in the motion tracks/trajectories when the surgeon is pausing/halting the surgical motions for specific reasons, e.g., when hesitating while making a decision or waiting for an item from another person. However, processing these idle periods of the input feature representations 812 with equal or substantially equal weights as those highly-relevant and important portions of the input feature representations 812 clearly would result in reduced overall accuracy of the predicted skill classification by skill-assessment system 800.

Because the inputs to skill-assessment system 800 is an extended-duration (e.g., a few minutes or longer) time-series and the input time-series can include both data that are highly-relevant and significant to the skill classifications and data that are not relevant or insignificant to the skill classifications, transformer model 804 is configured to utilize the self-attention technique to process input feature representations 812. Specifically, transformer model 804 in skill-assessment system 800 includes an self-attention module 806 that is configured to process the received feature representations 812 to (1) identify and filter out portions of the sequence of feature representations 812 that are not relevant or insignificant to the surgeon's skill and for making the skill predictions; and (2) focus the attention of transformer model 804 on those identified portions of the sequence of feature representations 812 that are highly-relevant and significant to the surgeon's skill for making the skill predictions.

Note that in the same manner a natural language processing (NLP) transformer focuses its attention on the parts of the input text that are most importation for class classification, the disclosed self-attention module 806 is configured to focus the attention on those parts of the motion track that are most relevant and important for skill assessments and classifications. Hence, the input sequence of feature matrices 812 can be analogized to a sequence of words of an input sentence/paragraph/article to a translator model. In some embodiments, transformer model 804 and self-attention module 806 are configured to process the input sequence of feature matrices 812 one small section at a time. As a result, the generated attention weights are continuously updated to refocus the attention of transformer model 804 for different sections of the input sequence of feature matrices 812 as transformer model 804 moves down the input sequence. Eventually, transformer model 804 generates a skill classification vector 814 as the output of learning-based skill-assessment system 800, wherein the skill classification vector 814 can include a computed probability value for the high-skill classification, and a computed probability value for the low-skill classification. Note that because the input to skill-assessment system 800 is a sequence of feature matrices and output of skill-assessment system 800 is a skill classification vector (e.g., of two classes), transformer model 804 can be configured based on the sequence-vector model, wherein the vector is the output skill classifications.

Even though skill-assessment system 800 is configured to generate a single skill classification decision for the input temporal-sequence of feature matrices 810, the input temporal-sequence of feature matrices 810 does not have to correspond to an entire track. Instead, the input temporal-sequence of feature matrices 810 can be tailored to correspond to any portion of a generated track, and as such can vary in both duration and location in the track. Consequently, learning-based skill-assessment system 800 can be used to generate a more targeted skill assessment/classification for any portion of a generated motion track. In other words, learning-based skill-assessment system 800 is capable of processing any length of the input temporal-sequence of feature matrices 810 and therefore any duration in the corresponding motion track.

Figure 9:
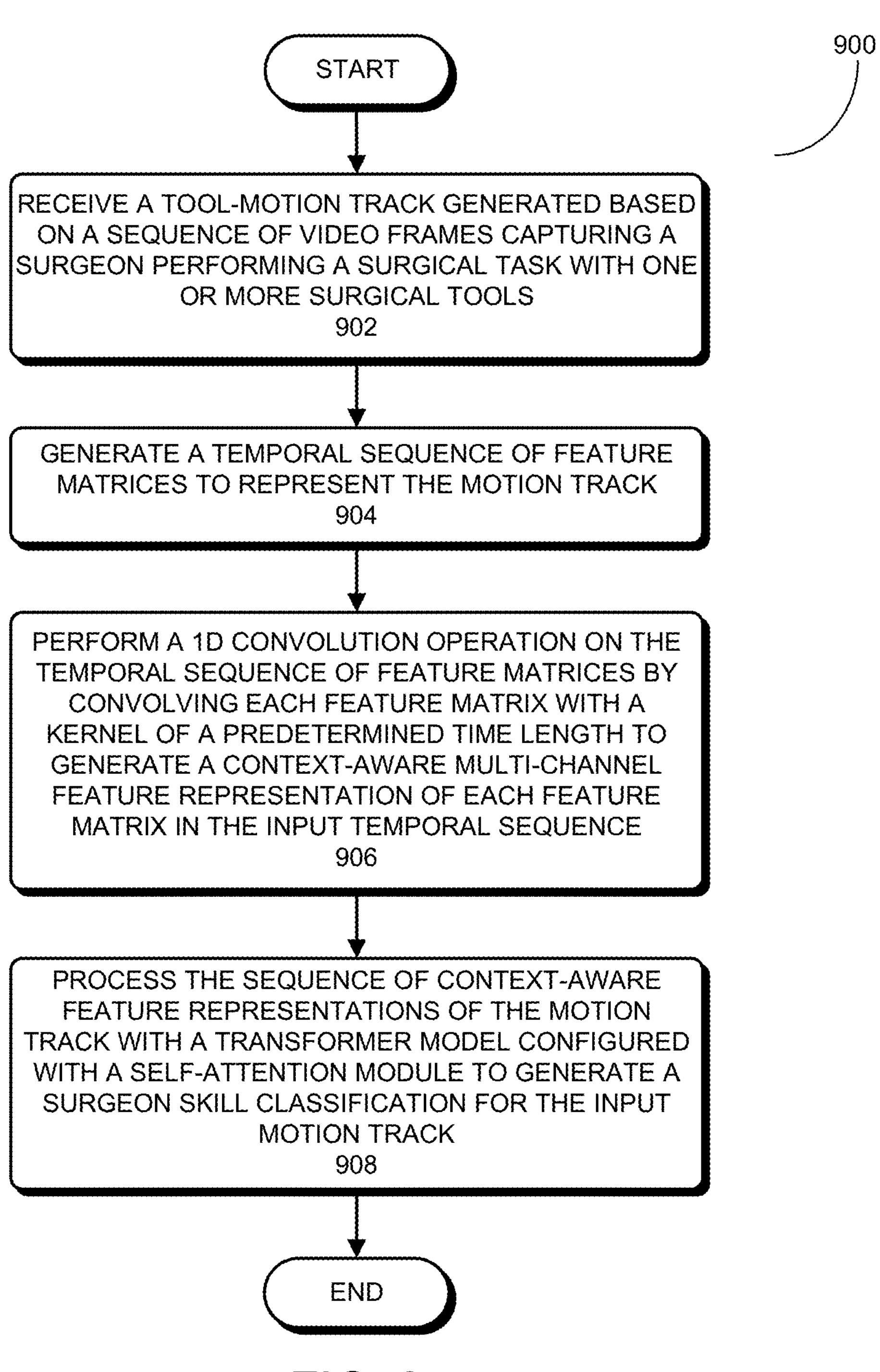
FIG. 9 presents a flowchart illustrating an exemplary process for performing learning-based surgeon skill assessment using a tool-motion track generated based on a surgical video in accordance with some embodiments described herein.

FIG. 9 presents a flowchart illustrating an exemplary process 900 for performing learning-based surgeon skill assessment using a tool-motion track generated based on a surgical video in accordance with some embodiments described herein. In one or more embodiments, one or more of the steps in FIG. 9 may be omitted, repeated, and/or performed in a different order. Accordingly, the specific arrangement of steps shown in FIG. 9 should not be construed as limiting the scope of the technique.

During operation, process 900 receives a tool-motion track generated based on a sequence of video frames capturing a surgeon performing a surgical task with one or more surgical tools (step 902). In various embodiments, the received tool-motion track is generated by the disclosed MSTT system 100. Next, process 900 generates a temporal sequence of feature matrices to mathematically represent the motion track (step 904). Specifically, each time-step in the motion track can be represented by a feature matrix within the generated temporal sequence of feature matrices that is composed of the following set of parameters: (1) the time-stamp; (2) the (x, y) coordinates of the detected tool in the video frame at the time-step; (3) the size/area of the bounding box of the detected tool at the time-step; and optionally (4) a temporal mask indicating the tool present/absence in the video frame. Note that the mathematical representation of the motion track is a multi-channel 1D signal.

Next, process 900 performs a 1D convolution operation on the temporal sequence of feature matrices by convolving each feature matrix at a given time-step with a kernel of a predetermined time length to generate a context-aware multi-channel feature representation of each feature matrix of the input temporal sequence (step 906). As a result, an input multi-channel feature matrix at a given time-step is projected into larger context-aware feature representation that embeds an amount of learned relationships to the adjacent time-steps both before and after the given time-step. Note that the 1D convolution operation of step 906 serves to learn short-range relationships of tool locations from the tool-motion track, which represent atomic motions of the tool.

Process 900 subsequently processes the sequence of context-aware feature representations of the motion track with a transformer model configured with a self-attention module to generate a surgeon skill classification for the input motion track (step 908). In some embodiments, the transformer model is configured to infer the surgeon skill levels based at least on the smoothness of the tool motions embedded in the sequence of context-aware feature representations. More specifically, the transformer model is configured to both recognize when surgeon moving the tool with fluid and smooth motions as indicators of good skills, and to recognize when surgeon moving the tool with jerking and stuttering motions, and/or with halting motions as indicators of poor skills. In some embodiments, the self-attention module within the transformer model is configured to process the sequence of context-aware feature representations to (1) filter out portions of the feature representations that are not relevant to the surgeon's skills and to (2) focus the attention of the transformer model on those portions of the feature representations that are highly-relevant to the surgeon's skill for making the skill predictions.

Note that both the feature-based skill-assessment technique described in conjunction with FIG. 7 and the learning-based skill-assessment technique described in conjunction with FIGS. 8-9 have ability to classify surgeon's skill directly from the tool-motion-tracking information. However, the feature-based skill-assessment technique generates motion metrics by computing a single average value for the entire track. This implies that if the surgeon generally performs tasks well for the long term, but has one or two short "bad" moments, these short "bad" moments are going to be averaged out by the long periods of good performances. Hence, if identifying such "bad" moments is important for making accurate skill assessment, the feature-based skill-assessment approach does not have the ability to focus attentions on those important events (e.g., the short bad moments) by using the single average metric value across the entire track. In contrast, the disclosed learning-based skill-assessment technique is capable of learning and determining what types of motions are the important/relevant motions for the model to focus on. The disclosed learning-based skill-assessment technique is also capable of creating a representation for a specific type of motion or motion sequence that matters to a predefined skill criterion. The learning-based skill-assessment technique can then focus on a portion of the track that corresponds to such a motion or a motion sequence, regardless of the length of the motion or the motion sequence. It has been observed that the learning-based skill-assessment technique generally outperforms the feature-based skill-assessment technique, which suggests that the learning-based skill-assessment technique is capable of extracting motion features that are more meaningful and relevant to skill assessments than conventional motion features used by the feature-based skill-assessment technique.

Figure 10:
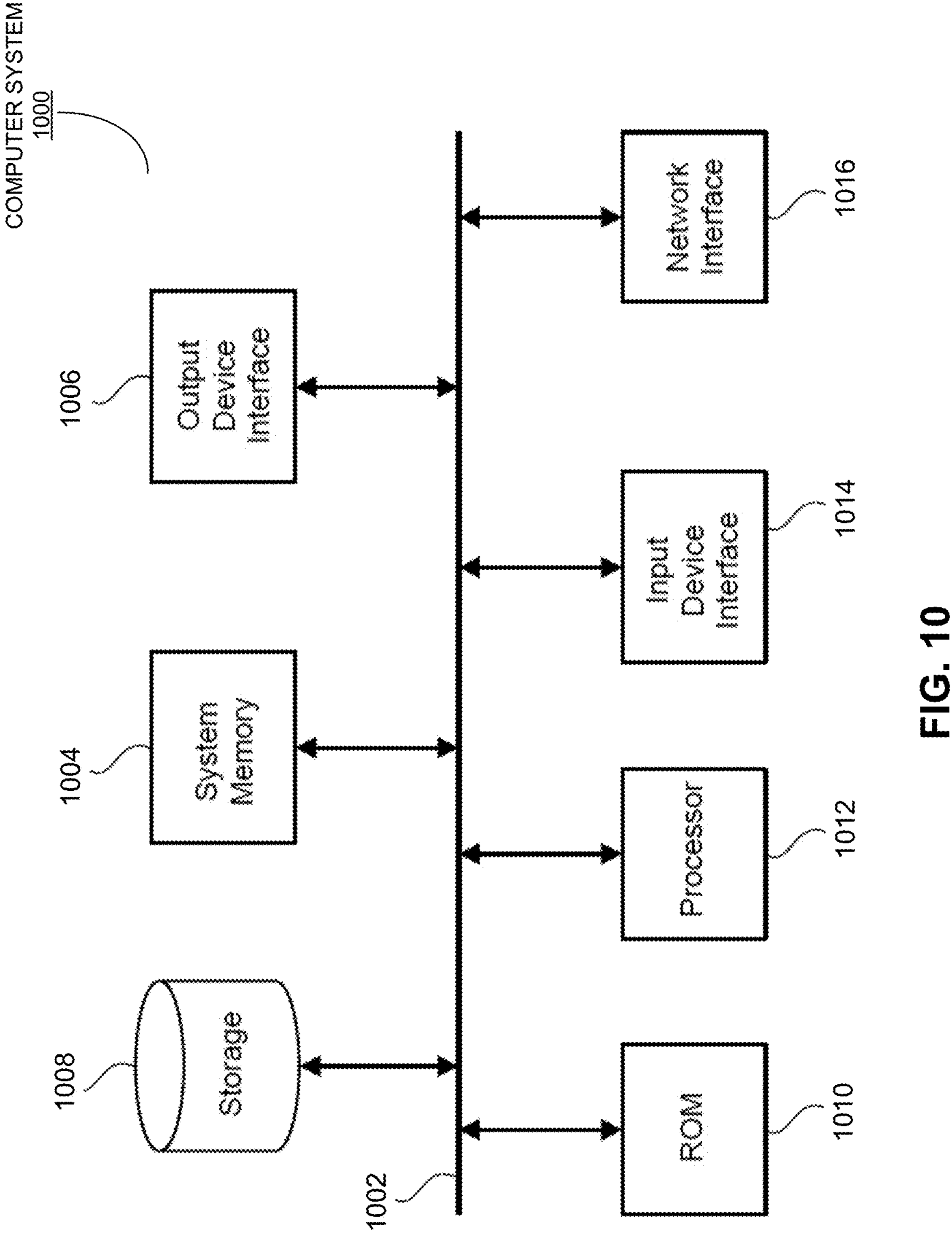
FIG. 10 conceptually illustrates a computer system with which some embodiments of the subject technology can be implemented.

FIG. 10 conceptually illustrates a computer system with which some embodiments of the subject technology can be implemented. Computer system 1000 can be a client, a server, a computer, a smartphone, a PDA, a laptop, or a tablet computer with one or more processors embedded therein or coupled thereto, or any other sort of computing device. Such a computer system includes various types of computer-readable media and interfaces for various other types of computer-readable media. Computer system 1000 includes a bus 1002, processing unit(s) 1012, a system memory 1004, a read-only memory (ROM) 1010, a permanent storage device 1008, an input device interface 1014, an output device interface 1006, and a network interface 1016. In some embodiments, computer system 1000 is a part of a robotic surgical system.

Bus 1002 collectively represents all system, peripheral, and chipset buses that communicatively connect the numerous internal devices of computer system 1000. For instance, bus 1002 communicatively connects processing unit(s) 1012 with ROM 1010, system memory 1004, and permanent storage device 1008.

From these various memory units, processing unit(s) 1012 retrieves instructions to execute and data to process in order to execute various processes described in this patent disclosure, including the above-described multiple surgical tool detection and tracking techniques described in conjunction with FIGS. 1-6 and the above-described video-based surgeon-skill-assessment techniques described in conjunction with FIGS. 7-9. The processing unit(s) 1012 can include any type of processor, including, but not limited to, a microprocessor, a graphic processing unit (GPU), a tensor processing unit (TPU), an intelligent processor unit (IPU), a digital signal processor (DSP), a field-programmable gate array (FPGA), and an application-specific integrated circuit (ASIC). Processing unit(s) 1012 can be a single processor or a multi-core processor in different implementations.

ROM 1010 stores static data and instructions that are needed by processing unit(s) 1012 and other modules of the computer system. Permanent storage device 1008, on the other hand, is a read-and-write memory device. This device is a non-volatile memory unit that stores instructions and data even when computer system 1000 is off. Some implementations of the subject disclosure use a mass-storage device (such as a magnetic or optical disk and its corresponding disk drive) as permanent storage device 1008.

Other implementations use a removable storage device (such as a floppy disk, flash drive, and its corresponding disk drive) as permanent storage device 1008. Like permanent storage device 1008, system memory 1004 is a read-and-write memory device. However, unlike storage device 1008, system memory 1004 is a volatile read-and-write memory, such as a random access memory. System memory 1004 stores some of the instructions and data that the processor needs at runtime. In some implementations, various processes described in this patent disclosure, including the above-described multiple surgical tool detection and tracking techniques described in conjunction with FIGS. 1-6 and the above-described video-based surgeon-skill-assessment techniques described in conjunction with FIGS. 7-9, are stored in system memory 1004, permanent storage device 1008, and/or ROM 1010. From these various memory units, processing unit(s) 1012 retrieves instructions to execute and data to process in order to execute the processes of some implementations.

Bus 1002 also connects to input and output device interfaces 1014 and 1006. Input device interface 1014 enables the user to communicate information to and select commands for the computer system. Input devices used with input device interface 1014 include, for example, alphanumeric keyboards and pointing devices (also called "cursor control devices"). Output device interface 1006 enables, for example, the display of images generated by the computer system 1000. Output devices used with output device interface 1006 include, for example, printers and display devices, such as cathode ray tubes (CRT) or liquid crystal displays (LCD). Some implementations include devices such as a touchscreen that functions as both input and output devices.

Finally, as shown in FIG. 10, bus 1002 also couples computer system 1000 to a network (not shown) through a network interface 1016. In this manner, the computer can be a part of a network of computers (such as a local area network ("LAN"), a wide area network ("WAN"), an intranet, or a network of networks, such as the Internet. Any or all components of computer system 1000 can be used in conjunction with the subject disclosure.

The various illustrative logical blocks, modules, circuits, and algorithm steps described in connection with the embodiments disclosed in this patent disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, flash memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer-program product.

While this patent document contains many specifics, these should not be construed as limitations on the scope of any disclosed technology or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A computer-implemented method for classifying a surgeon's technical skill in performing a surgery, the method comprising:

receiving a tool-motion track comprising a sequence of detected tool motions of a surgeon performing a surgery with a surgical tool;

generating a sequence of multi-channel feature matrices to mathematically represent the tool-motion track; and processing the sequence of multi-channel feature matrices using a deep-learning model to generate a skill classification for the surgeon performing the surgery, wherein the deep-learning model is a transformer model, and wherein processing the sequence of multi-channel feature matrices using the deep-learning model comprises:

performing a one-dimensional (1D) convolution operation on the sequence of multi-channel feature matrices by convolving each multi-channel feature matrix within the sequence of multi-channel feature matrices with a kernel having a predetermined time length to generate a context-aware multi-channel feature representation of the multi-channel feature matrix, as part of a sequence of context-aware multi-channel feature representations; and processing the sequence of context-aware multi-channel feature representations of the tool-motion track, by the transformer model, to generate the skill classification.

2. The computer-implemented method of claim 1 wherein the deep-learning model has been trained to identify and focus on a subset of tool motions in the sequence of detected tool motions that are most relevant to the skill classification and wherein the transformer model identifies and focuses on the subset of tool motions that are most relevant to the skill classification by using a self-attention technique.

3. The computer-implemented method of claim 1 wherein convolving each multi-channel feature matrix with the kernel involves separately convolving each channel of the multi-channel feature matrix with the kernel.

4. The computer-implemented method of claim 1 wherein the 1D convolution operation compares the multi-channel feature matrix at a given time-step with a number of adjacent time-steps both before and after the given time-step; and wherein the context-aware multi-channel feature representation embeds an amount of learned relationships to the number of adjacent time-steps both before and after the given time-step.

5. The computer-implemented method of claim 1, wherein the tool-motion track is generated based on a sequence of locations of the tool detected within a sequence of video frames captured at a set of time-steps; and wherein each multi-channel feature matrix within the sequence of multi-channel feature matrices is generated at a corresponding time-step in the set of time-steps.

6. The computer-implemented method of claim 5, wherein the multi-channel feature matrix is composed of at least the following signal channels:

a time-step;

a (X, Y) coordinates of the detected tool location within the corresponding video frame detected at the time-step; and a size of a bounding box of the detected tool within the corresponding video frame detected at the time-step.

7. The computer-implemented method of claim 6, wherein the multi-channel feature matrix additionally includes a temporal mask channel indicating the tool present/absence in the corresponding video frame.

8. A surgeon-skill classification system, comprising:

one or more processors;

a memory coupled to the one or more processors, wherein the memory stores instructions that, when executed by the one or more processors:

receive a motion track comprising a sequence of detected tool motions of a surgeon performing a surgery with a surgical tool;

generate a sequence of multi-channel feature matrices to mathematically represent the motion track; and process the sequence of multi-channel feature matrices using a deep-learning model to generate a skill classification for the surgeon performing the surgery, wherein the deep-learning model is a transformer model, and wherein to process the sequence of multi-channel feature matrices using the deep-learning model:

a one-dimensional (1D) convolution operation is performed on the sequence of multi-channel feature matrices by convolving each multi-channel feature matrix within the sequence of multi-channel feature matrices with a kernel of a predetermined time length to generate a context-aware multi-channel feature representation of the multi-channel feature matrix as part of a sequence of context-aware multi-channel feature representations; and the sequence of context-aware multi-channel feature representations of the motion track is processed by the transformer model to generate the skill classification.

9. The surgeon-skill classification system of claim 8 wherein the memory further stores instructions that, when executed by the one or more processors, cause the system to use the transformer model to identify and focus on a subset of tool motions in the sequence of detected tool motions by using a self-attention technique.

10. The surgeon-skill classification system of claim 8 wherein the memory further stores instructions that, when executed by the one or more processors, cause the system to convolve each multi-channel feature matrix with the kernel by separately convolving each channel of the multi-channel feature matrix with the kernel.

11. The surgeon-skill classification system of claim 8 wherein the 1D convolution operation compares the multi-channel feature matrix at a given time-step with a number of adjacent time-steps both before and after the given time-step; and wherein the context-aware multi-channel feature representation embeds an amount of learned relationships to the number of adjacent time-steps both before and after the given time-step.

12. The surgeon-skill classification system of claim 8, wherein the motion track is generated based on a sequence of locations of the tool detected within a sequence of video frames captured at a set of time-steps; and wherein each multi-channel feature matrix within the sequence of multi-channel feature matrices is generated at a corresponding time-step in the set of time-steps.

13. The surgeon-skill classification system of claim 12, wherein the multi-channel feature matrix is composed of some or all of the following signal channels:

a time-step;

a (X, Y) coordinates of the detected tool location within the corresponding video frame detected at the time-step;

a size of a bounding box of the detected tool within the corresponding video frame detected at the time-step; and a temporal mask indicating the tool present/absence in the corresponding video frame.

* * * * *